(12) United States Patent
Shimizu et al.

(10) Patent No.: US 6,317,182 B1
(45) Date of Patent: Nov. 13, 2001

(54) LIQUID CRYSTAL DISPLAY APPARATUS

(75) Inventors: Hidehisa Shimizu, Sagamihara; Kaoru Kusafuka, Kawasaki; Shinichi Kimura, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,928

(22) Filed: Jun. 23, 1999

(30) Foreign Application Priority Data

Jun. 23, 1998 (JP) .................................................. 10-176076

(51) Int. Cl.[7] .................................................. G02F 1/1333
(52) U.S. Cl. .................................................. 349/141
(58) Field of Search .................................................. 349/141

(56) References Cited

U.S. PATENT DOCUMENTS 5,959,708 * 9/1999 Lee et al. .............................. 349/143

FOREIGN PATENT DOCUMENTS 63-21907   5/1998 (JP) .

OTHER PUBLICATIONS

Flat–Panel Display, (1996).

* cited by examiner

Primary Examiner—James A. Dudek
(74) Attorney, Agent, or Firm—Scully, Scott, Murphy & Presser; Marian Underweiser, Esq.

(57) ABSTRACT

The object of the present invention is to decrease the generation of the reverse twist in the liquid crystal display device of IPS structure to prevent the generation of afterimage, whereby the present invention can improve the response speed and the aperture ratio.

In the structure of the electrodes for the IPS mode in which a switching electrode of one polarity and a switching electrode of the other polarity are arranged in parallel and a supplementary capacitor is arranged in non-parallel to the switching electrodes, a shape of an electrode formed at an upper side of the supplementary capacitor differs from a shape of an electrode formed at a lower side of the supplementary capacitor. It is particularly desired that a portion of the upper side electrode is removed which is adjacent to a light transmitting region generating a reverse twist.

9 Claims, 23 Drawing Sheets

ELECTRODE A

ELECTRODE B

OVERLAP OF ELECTRODE A WITH ELECTRODE B

LIQUID CRYSTAL DISPLAY APPARATUS

BACKGROUND OF THE INVENTION

1. Technical Field

The present invention relates to an improvement of a structure of electrodes of an active matrix type liquid crystal display (LCD) device with the so-called IPS (In Plane Switching) structure. More particularly, the present invention relates to a wiring structure of the LCD device which can remove an afterimage, and can improve a response speed and an aperture ratio by suppressing a reverse twist of liquid crystal molecules.

2. Prior Art

A display scheme has been broadly used, in which a display device using the liquid crystal material uses a liquid crystal layer of a nomadic liquid crystal in a twisted arrangement, and an electric field is applied in a vertical direction to substrates. In this scheme, two polarizing plates sandwiching the liquid crystal layer are so arranged that their polarizing axes vertically cross to each other. At the application of the electric field, the liquid crystal molecules are arranged in the vertical direction to the substrate, so that a black image is displayed. In the case that the liquid crystal molecules are arranged in the vertical direction at the application of the electric field, however, it causes a problem that the light transmitting through the liquid crystal layer in an oblique direction transmits along a birefringence path, so that the polarization direction is rotated, resulting that a full black can not be displayed to decrease a contrast ratio when an user observes the LCD device in the oblique direction, and a viewing angle for displaying the high quality image becomes narrow.

To solve such problem, the LCD device of the IPS mode in which the electric field is applied in a parallel direction to the surface of the substrates has, been proposed. It has been known that the liquid crystal molecules are rotated in a parallel plane to the surface of the substrate in the IPS mode, so that a difference between a birefringence rate at the application of the electric field and a birefringence ratio at the non-application of the electric field when the user observes the LCD device in the oblique direction becomes small, whereby the viewing angle can be broadened.

In the IPS mode for rotating the liquid crystal molecules by the electric field in the lateral direction, a method has been proposed in a Japanese Published Examined Patent Application 63-21907, which uses a pair of interdigital electrodes as the switching electrodes. In a structure proposed in Flat Panel Display, 1996, page 158, in which one switching electrode is disposed at each of a pair of edges, opposed to each other, of a light transmitting region of a square shape of one pixel element, respectively, for simplifying the structure of the electrodes to prevent a decrease of the aperture ratio, (wherein, the light transmitting region can be separated by a switching electrode into a plurality of right transmitting regions, as shown in FIGS. 3 and 4), two supplementary electrodes are disposed at each of a remaining pair of edges, opposed to each other, of the light transmitting region, respectively, and an insulating layer is sandwiched between the two supplementary capacitor electrodes to form a supplementary capacitor. This arrangement, in which the switching electrode and the supplementary capacitor electrode are integrally formed, the switching electrodes are disposed at each of one pair of edges of the light transmitting region, and the supplementary capacitor electrodes are disposed at each of the remaining pair of edges of the light transmitting region, realizes a merit for simplifying the structure of the electrodes and for improving the aperture ratio. The simplification of the electrodes is, very important in the IPS mode for the following two reasons. First, it is necessary, in the IPS mode, to make a space for the supplementary capacitor electrodes by simplifying the structure of the electrodes since the space used for the electrodes is very small, in comparison to the prior pixel element region using the twisted nomadic arrangement in which a broad transparent electrode is formed on each of the substrates, so that there is a little margin in a capacitance for storing charges. Second, since the direction of the electric field is not stabilized above the switching electrodes in the IPS mode, the image quality is degraded, so that opaque electrodes rather than the transparent electrodes are used as the material of the switching electrodes in the IPS mode, and hence if the structure of the electrodes is complicated, the aperture ratio is decreased. The merit obtained by using such structure of the electrodes is an electromagnetic shield effect of the supplementary capacitor electrodes in addition to the simplification of the structure of the electrodes. For example, in the structure shown in the FIG. 1, a bad electric effect on the orientation of the liquid crystal molecules in the light transmitting region 20 caused by a gate line 4 can be shielded by the supplementary capacitor electrode 14. Also, the bad electric effect caused by a gate line of an adjacent pixel element, not shown, can be shielded by a supplementary capacitor electrode 12. The stability of image can be improved by such electromagnetic shield effect.

In the case using such integral type supplementary capacitor electrodes, however, since the direction of the electric field at edge portions of the light transmitting region does not always vertically crosses to the switching electrodes at the application of the electric field, as described later in detail, an occurrence of the liquid crystal molecules with a reverse twist, which is opposite to the designed twist for the ideal IPS mode, can not be avoided. Even if the liquid crystal molecules are rotated in the positive twist rotative direction or the reverse twist direction, the designed correct orientation can be obtained in the case that all the liquid crystal molecules are orientated in one direction. However, if the region, in which the liquid crystal molecules are rotated in the positive twist direction, and the region, in which the liquid crystal molecules are rotated in the reverse twist direction, simultaneously exist, it takes a certain time period for the liquid crystal molecules existing in a boundary region between both the above two regions to complete the orientation, so that the problem, such as the decrease of the response speed and the display of the afterimage, is caused. Since most of such reverse twist are generated at the edge portions of the light transmitting region, it is possible to hide the afterimage in the edge portions by forming a black matrix. In this case, however, the aperture ratio is decreased.

It is an object of the present invention to decrease the occurrence of the reverse twist to improve the response speed and the aperture ratio.

SUMMARY OF THE INVENTION

The present invention relates to a liquid crystal display apparatus comprising: a pair of substrates; a pixel electrode formed on one of the pair of substrates and formed in each of pixel elements, and including at least one first switching electrode, at least one second switching electrode disposed in parallel to the first switching electrode and a supplementary capacitor; at least one light transmitting region defined by the first switching electrode and the second switching electrode; and a liquid crystal layer sandwiched between the pair of substrates, and including liquid crystal molecules oriented in a plane parallel to a surface of the substrate; wherein the supplementary capacitor comprises a first supplementary capacitor electrode connected to the first switching electrode and arranged in a direction which is non-parallel to the first switching electrode; an insulating layer formed on the first supplementary capacitor electrode, and a second supplementary capacitor electrode formed on the insulating layer, connected to the second switching electrode and arranged in a direction which is non-parallel to the second switching electrode, and wherein a size of the first supplementary capacitor electrode adjacent to the light transmitting region is differs from a size of the second supplementary capacitor electrode adjacent to the light transmitting region.

The present invention further relates to a liquid crystal display apparatus, wherein the first supplementary capacitor electrode is connected to the first switching electrode in a direction substantially vertical to the first switching electrode.

Still further, the present invention relates to a liquid crystal display apparatus, where n the liquid crystal molecules are rotated in a predetermined direction in the plane parallel to the surface of the substrate by an electric field generated between the first switching electrode and the second switching electrode, and a size of a portion, adjacent to the light transmitting region, of the second supplementary capacitor electrode is smaller than a size of a portion, adjacent to the light transmitting region, of the first supplementary capacitor electrode to prevent an reverse twist of the liquid crystal molecules from being generated by an electric field which is generated between the first switching electrode and the second supplementary capacitor electrode.

Yet ever further, the present invention relates to a liquid crystal display apparatus wherein the supplementary capacitor includes an additional supplementary capacitor.

The present invention also relates to a liquid crystal display apparatus wherein the additional supplementary capacitor includes a first additional supplementary capacitor electrode connected to the first switching electrode in a direction substantially vertical to the first switching electrode, a second additional supplementary capacitor electrode connected to the second switching electrode in a direction substantially vertical to the second switching electrode, and an insulating layer; and a shape of a portion, adjacent to the light transmitting region, of the second additional supplementary capacitor electrode is larger than a shape of a portion, adjacent to the light transmitting region, of the first additional supplementary capacitor electrode.

Additionally, the present invention relates to a liquid crystal display apparatus wherein the number of first switching electrodes is N (wherein N is an integer equal to or larger than 2) and the number of second switching electrodes is (N−1); or the number of first switching electrodes is (N−1) and the number of second switching electrodes is N; the first switching electrodes and the second switching electrodes are alternately arranged; and the number of light transmitting regions is (2N−2).

The present invention further relates to a liquid crystal display apparatus wherein two light transmitting regions are formed at both sides of the first switching electrode or the second switching electrode; the shape of portion, adjacent to one of the two light transmitting regions, of the second supplementary capacitor electrode and the shape of portion, adjacent to the other light transmitting region, of the second supplementary capacitor electrode are non-symmetrical around the first switching electrode or the second switching electrode. Still even further, the present invention relates to a liquid crystal display apparatus wherein two light transmitting regions are formed at both sides of the first switching electrode or the second switching electrode; the shape of portion, adjacent to one of the two light transmitting regions, of the second supplementary capacitor electrode and the shape of portion, adjacent to the other light transmitting region, of the second supplementary capacitor electrode are centrosymmetrical around a center point of the first switching electrode or the second switching electrode.

The present invention also relates to a liquid crystal display apparatus wherein a portion of the second supplementary capacitor electrode is aligned with an edge of the light transmitting region adjacent to the second supplementary capacitor electrode, and the length of the portion is in the range of 0% ç 50% of the length of the edge.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENTS OF THE INVENTION

The contents of the present invention is described hereinbelow.

Figure 1:
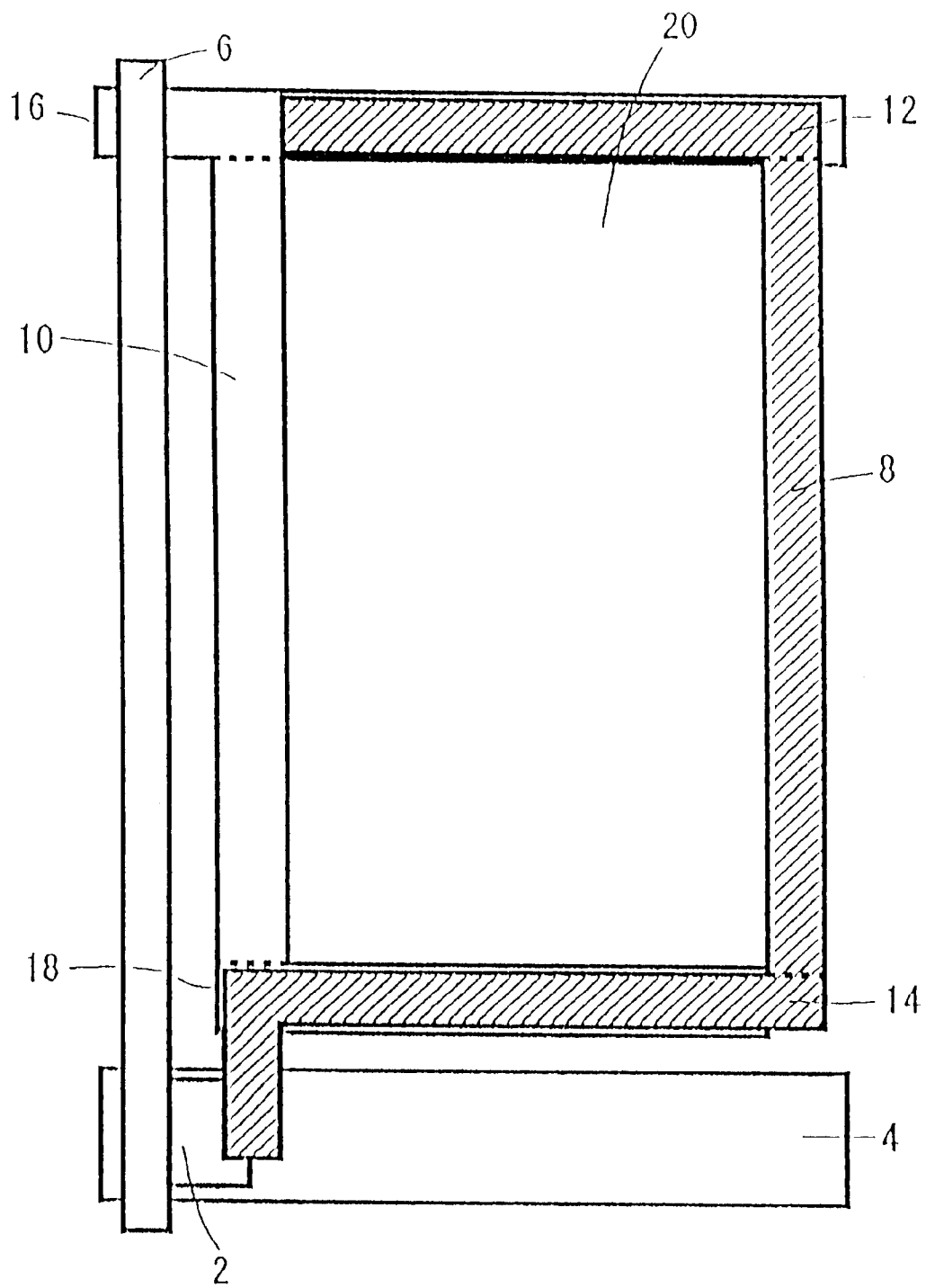
FIG. 1 shows a plan view of the prior structure of electrodes.
Figure 2:
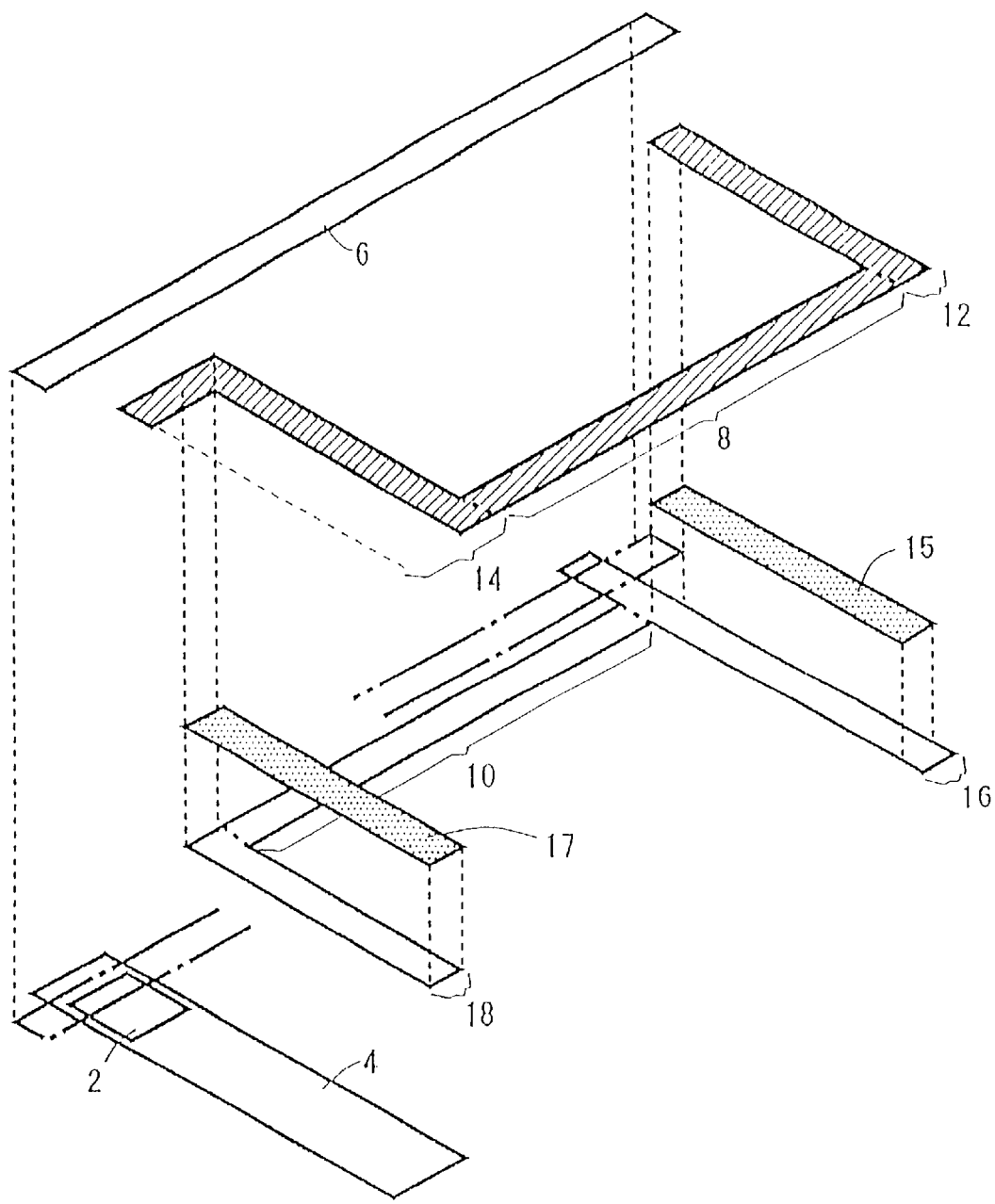
FIG. 2 shows the three dimensional relationship of the prior structure of electrodes.

The reasons for generating the reverse twist in the prior structure of electrodes are described in detail. First, it is described that the reasons for generating the region, in which the electric field is not uniformly distributed in the lateral direction, is generated in the prior structure of electrodes. The FIG. 1 shows the prior structure of electrodes of the IPS mode for controlling the orientation of the liquid crystal molecules of one pixel element through the TFT 2 connected to the gate line 4 and the data line 6. The FIG. 2 shows the three dimensional relationship of the electrodes shown in the FIG. 1. In the FIG. 1, it is possible to rotate the orientation of the liquid crystal molecules in the light transmitting region 20 to control the image display by applying the electric field in the lateral direction between the second switching electrode 8 and the first switching electrode 10. The second switching electrode 8 is integrally formed with second supplementary capacitor electrode 12 and the second supplementary capacitor electrode 14, and this second supplementary capacitor electrode 14 also operates as a drain electrode of the TFT 2. The first switching electrode 10 is integrally formed with the first supplementary capacitor electrode 16 and the first supplementary capacitor electrode 18, and the first supplementary capacitor electrode 16 is connected to the data line 6. The insulating layer 15 is inserted between the second supplementary capacitor electrode 12 and the first supplementary capacitor electrode 16, and the insulating layer 17 is inserted between the second supplementary capacitor electrode 14 and the first supplementary capacitor electrode 18 to operate as the supplementary capacitors, respectively, as shown in the FIG. 2.

Figure 3:
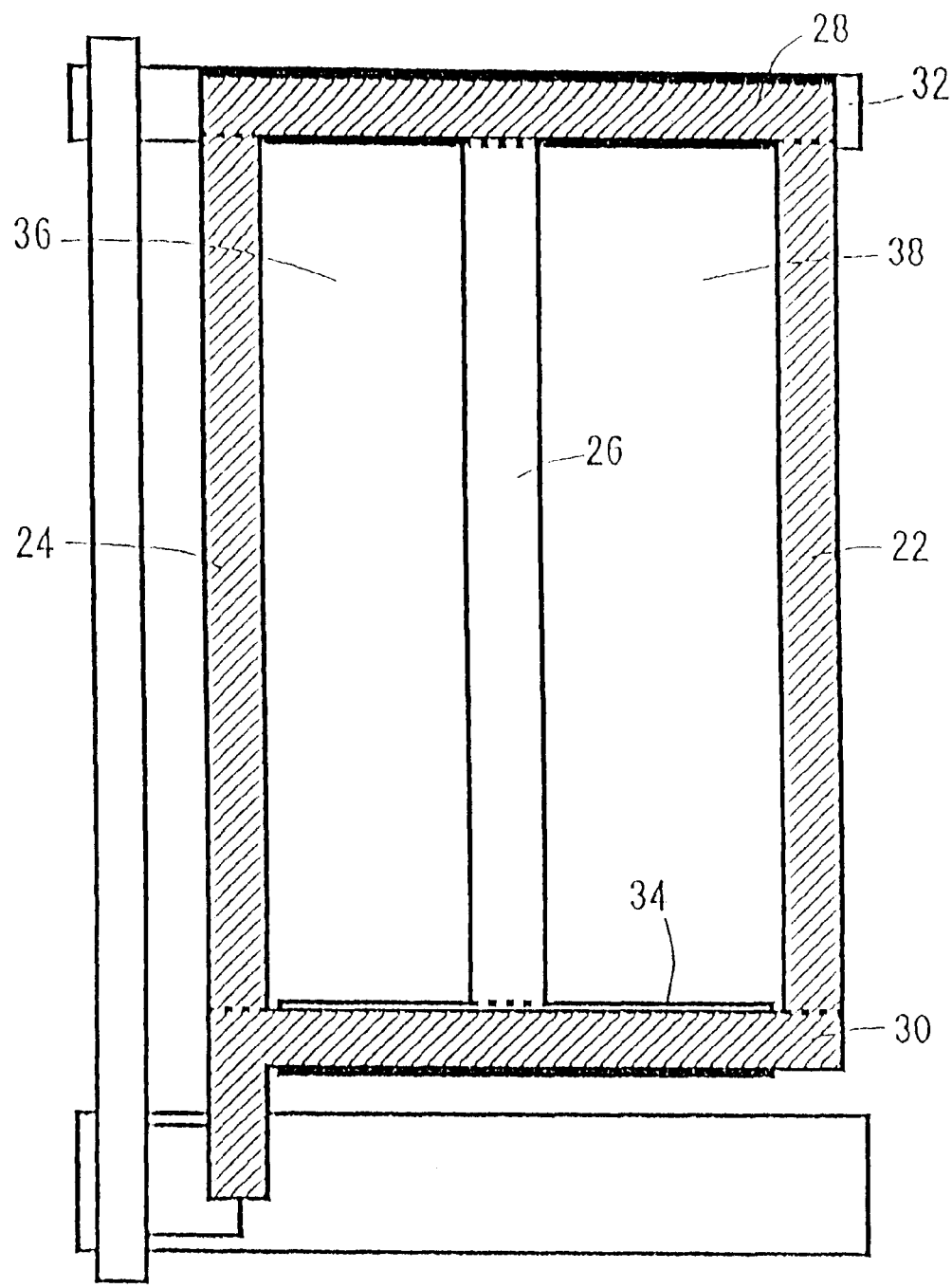
FIG. 3 shows a plan view of the prior structure of electrodes.
Figure 4:
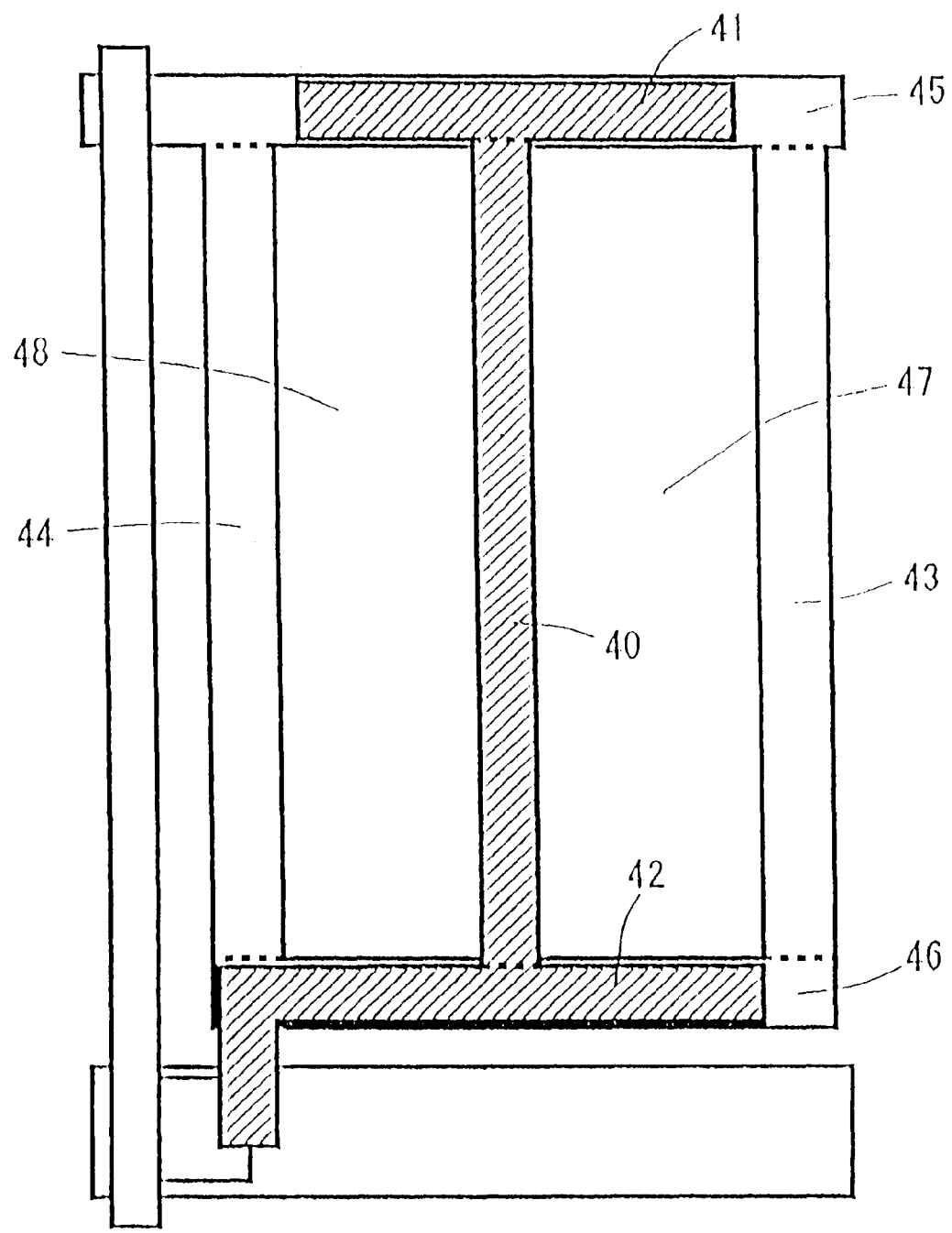
FIG. 4 shows a plan view of the prior structure of electrodes.

FIGS. 3 and 4 show a prior structure of electrodes in which two light transmitting regions are formed in one pixel element. In the structure shown in the FIG. 3, it is possible to rotate the orientation of the liquid crystal molecules in the light transmitting regions 36 and 38 to control the image display by applying the electric field in the lateral direction between the second switching electrode 24 and the first switching electrode 26 and between the second switching electrode 22 and the first switching electrode 26. The insulating layer, not shown, is inserted between the second supplementary capacitor electrode 28 and the first supplementary capacitor electrode 32, and the insulating layer is inserted between the second supplementary capacitor electrode 30 and the first supplementary capacitor electrode 34 to operate as the supplementary capacitors, respectively. The FIG. 4 shows the structure performing the similar operation to that of the structure shown in the FIG. 3. Since the same operation can be performed in the case that one light transmitting region is defined, as shown in the FIG. 2, in the case that two light transmitting regions are defined, as shown in the FIGS. 3 and 4, and to the case that more light transmitting regions are defined, the operation is described by using the case that the two light transmitting regions are defined, as an example.

Figure 5:
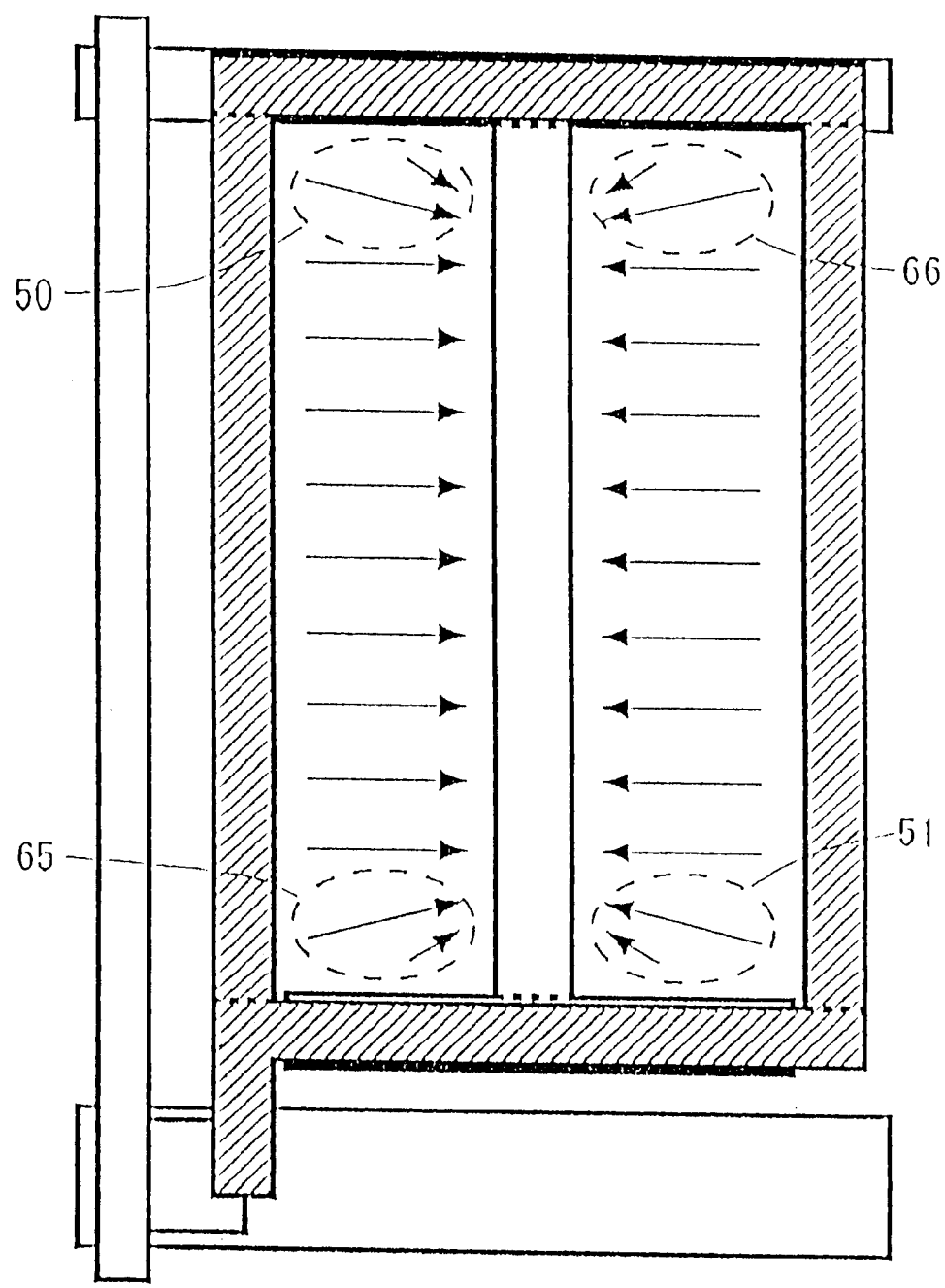
FIG. 5 shows the direction of the electric field in the prior structure of electrode.
Figure 6:
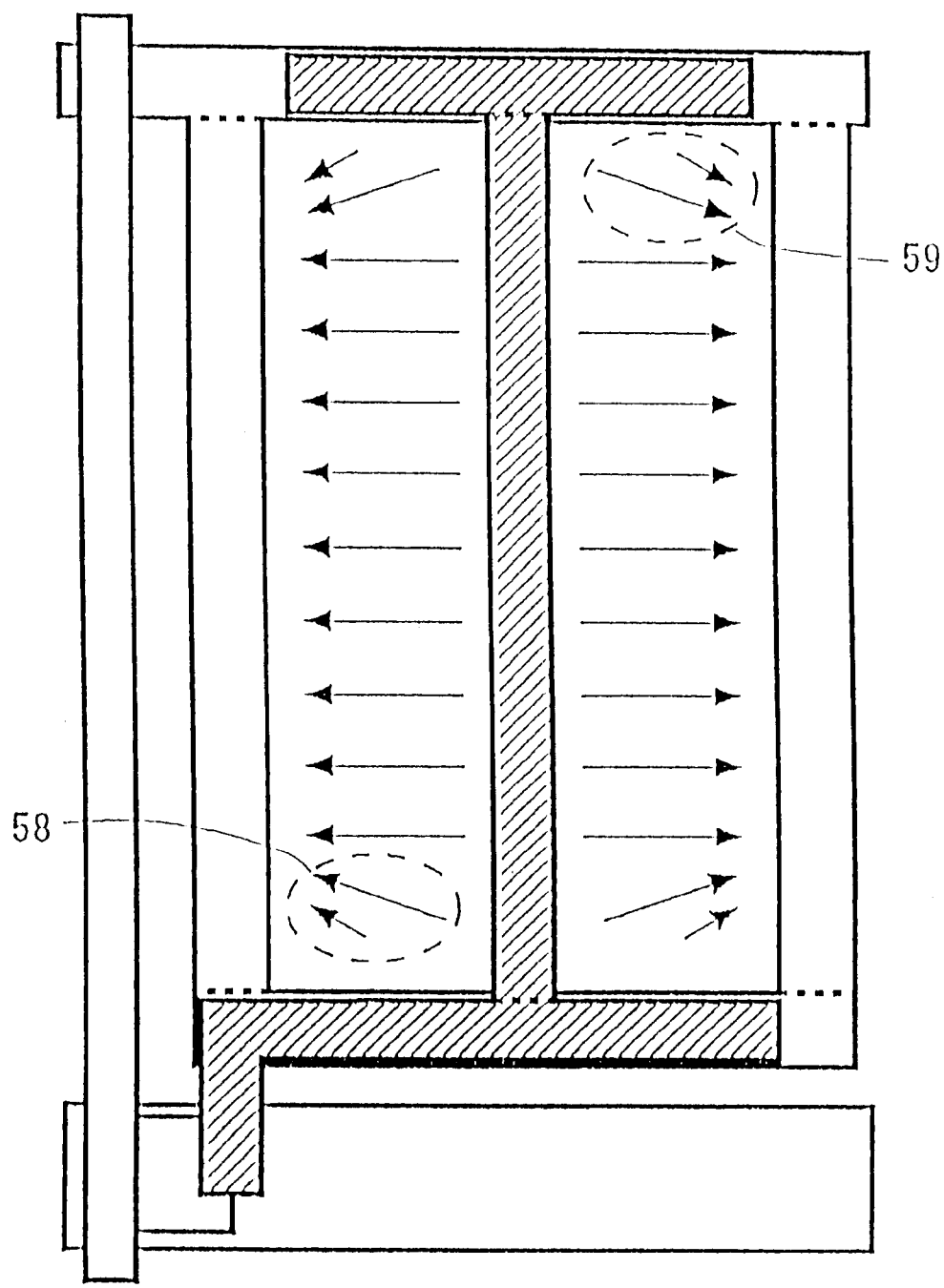
FIG. 6 shows the direction of the electric field in the prior structure of electrode.

The supplementary capacitor electrodes faced to each other operates to provide the supplementary capacitor. It is required, however, to arrange the supplementary capacitor electrodes to cross the switching electrodes by 90 degrees for the reasons of the reduction of the space of the pixel element and the increase of the electromagnetic shield, whereby the supplementary capacitor electrodes interact with the switching electrodes. For these reasons, the electric field in the oblique direction is generated in the light transmitting region in addition to the electric field in the lateral direction. FIGS. 5 and 6 show the direction of the electric field generated in the structures shown in the FIGS. 3 and 4, respectively. In both the cases, the phenomenon, in which the electric field in the oblique direction is generated in the region adjacent to the supplementary capacitor electrodes, is observed.

Figure 7:
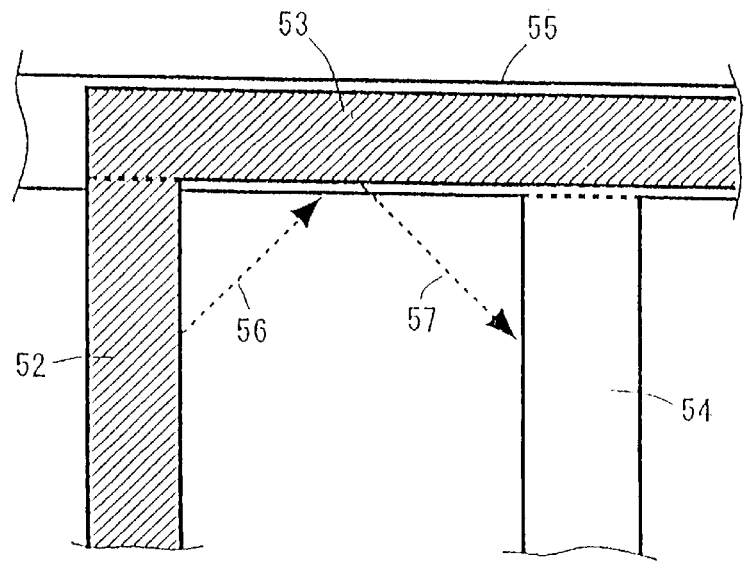
FIG. 7 shows the enlarged figure showing the prior structure of electrode.

FIG. 7 shows an enlarged figure of a region 50 in the FIG. 5, and the direction of the electric field other than the lateral direction in the region 50 is described. There exist an electric field 56 in a direction from the upper side second switching electrode 52 to the lower side first supplementary capacitor electrode 55 and an electric field 57 in a direction from the upper side second supplementary capacitor electrode 53 to the lower side first switching electrode 54 as the electric field in the direction other than the lateral direction in the region 50. Since the second switching electrode 52 and the second supplementary capacitor electrode 53 are integrally formed and are the same polarity, the electric field 56 is repulsed by the supplementary capacitor electrode 53. Accordingly, the electric fields 56 and 57 have the three dimensional relationship in which the electric field 56 extends or dives to the lower side of the electric field 57. Since the liquid crystal molecules exist above these electrodes, the orientation of them is not affected by the electric field 56, but is affected by the electric field 57. The directions of the electric field in the region 50 shown in the FIG. 5 indicate the direction of the electric field for actually affecting the orientation of the liquid crystal molecules, i.e. the direction of the electric field 57 shown in the FIG. 7. It will be understood that the electric field in the oblique direction is generated for the above reasons.

Next, the generation of the reverse twist by such electric field in the oblique direction is described. The liquid crystal molecules are classified into P type liquid crystal molecule which aligns along the direction of the applied electric field and N type liquid crystal molecule which aligns along a perpendicular direction to the direction of the applied electric field. The case of that the P type liquid crystal molecules are used and the case of that the N type liquid crystal molecules are used are separately described.

Figure 8:
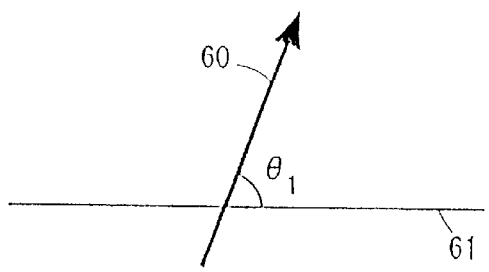
FIG. 8 shows the orientation direction of the liquid crystal molecules.

FIG. 8 shows the relationship between the orientation direction of the P type liquid crystal molecules at the non-application of the electric field and the lateral direction of the electric field. The direction 61 indicates the lateral direction of the applied electric field, and the direction 60 indicates the orientation direction of the liquid crystal molecules at the non-application of the electric field. The angle between the direction 61 of the electric field and the orientation direction 60 of the liquid crystal molecules is represented by the $\theta_e$, wherein $0° \leq \theta_e \leq 90°$. When the electric field is applied, the liquid crystal molecule rotates in a clockwise direction in the FIG. 8. Generally, although, in the most cases, the structure is so designed that $\theta_e$ is about $70° \sim 75°$, and the orientation of the liquid crystal molecule at the application of the electric field is ideally rotated to provide $\theta_e = 0°$, the selection of another angles is possible. The angle at the non-application of the electric field is $0° \leq \theta_e \leq 90°$, and if the angle $\theta$ is reduced by a predetermined angle due to the rotation of the liquid crystal molecules at the application of the electric field, the liquid crystal layer can perform the required ON/OFF operation.

Figure 9:
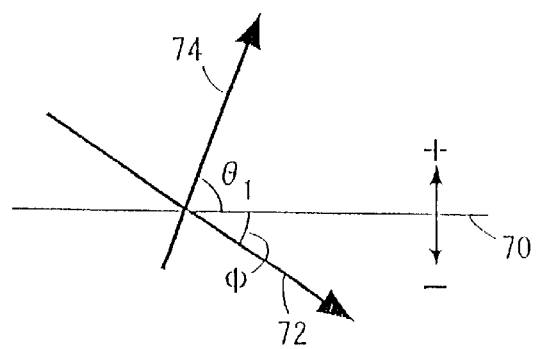
FIG. 9 shows the orientation direction of the liquid crystal molecules.

In contradistinction, in some cases, the rotating direction is reversed in the region in which the electric field of the oblique direction is generated. For example, considering the orientation of the liquid crystal molecules in the region 50 in the FIG. 5, in which the electric field of the oblique direction is generated, FIG. 9 shows the relationship of the electric field of the oblique direction 72 and the orientation direction 71 of the liquid crystal molecules at the non-application of the electric field. The direction 72 of the electric field is offset from the lateral direction 70 of the desired electric field by an angle $\theta$. In the case of $\theta_e + \theta \leq 90°$, the liquid crystal molecules orientated in the direction 74 at the non-application of the electric field rotate in the counter clockwise direction. This rotating direction is reverse to the rotating direction caused by the electric field of the lateral direction, and generates the reverse twist. The region 51 shown in the FIG. 5 and the regions 58 and 59 shown in the FIG. 6 generate the electric field of the oblique direction of the same angle, and hence it will be understood that the reverse twist is generated in the similar manner.

Figure 10:
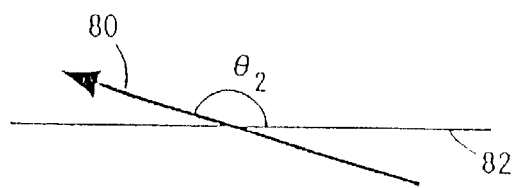
FIG. 10 shows the orientation direction of the liquid crystal molecules.

FIG. 10 shows the relationship between the direction of the N type liquid crystal molecules at the non-application of the electric field and the lateral direction of the electric field. The direction 82 indicates the lateral direction of the applied electric field, and the direction 80 indicates the orientation direction of the liquid crystal molecules at the non-application of the electric field. The angle between the direction 82 of the electric field and the orientation direction 80 of the liquid crystal molecules is represented by the $\theta_e$, wherein $90° \leq \theta_e \leq 180°$. When the electric field is applied, the liquid crystal molecule rotates in the clockwise direction in the FIG. 10. Generally, although, in the most cases, the structure is so designed that $\theta_e$ is about $160° \sim 165°$, and the orientation of the liquid crystal molecule at the application of the electric field is ideally rotated to provide $\theta_e = 90°$, the selection of another angles is possible. The angle at the non-application of the electric field is $90° \leq \theta_e \leq 180°$, and if the angle $\theta_e$ is reduced by a predetermined required angle due to the rotation of the liquid crystal molecules at the application of the electric field, the liquid crystal layer can perform the required ON/OFF operation.

Figure 11:
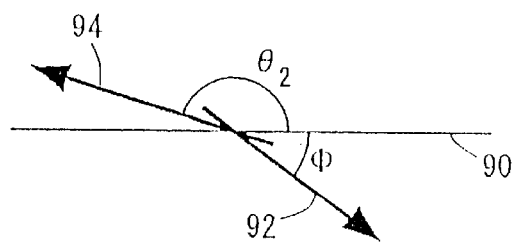
FIG. 11 shows the orientation direction of the liquid crystal molecules.

In contradistinction, in some cases, the rotating direction of the N type liquid crystal molecule is reversed in the region, in which the electric field of the oblique direction is generated. For example, considering the orientation of the liquid crystal molecules in the region 50 in the FIG. 5, in which the electric field of the oblique direction is generated, FIG. 11 shows the relationship of the electric field of the oblique direction 92 and the orientation direction 94 of the liquid crystal molecules at the non-application of the electric field. The direction 92 of the electric field is offset from the lateral direction 90 of the desired electric field by an angle $\theta$. In the case of $\theta_e + \theta \leq 180°$, the liquid crystal molecules orientated in the direction 94 at the non-application of the electric field rotate in the counter clockwise direction. This rotating direction is reverse to the rotating direction caused by the electric field of the lateral direction, and generates the reverse twist. The region 51 shown in the FIG. 5 and the regions 58 and 59 shown in the FIG. 6 generate the electric field of the oblique direction of the same angle, and hence it will be understood that the reverse twist is generated in the similar manner. In conclusion, in the case of that the electric field of the oblique direction is generated, the reverse twist of both the P and N type liquid crystal molecules is generated at the position adjacent to the corner of the light transmitting region.

Figure 12:
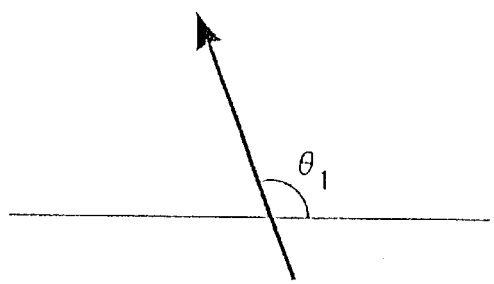
FIG. 12 shows the orientation direction of the liquid crystal molecules.
Figure 13:
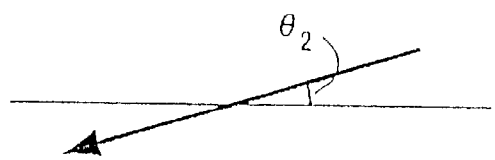
FIG. 13 shows the orientation direction of the liquid crystal molecules.
Figure 14:
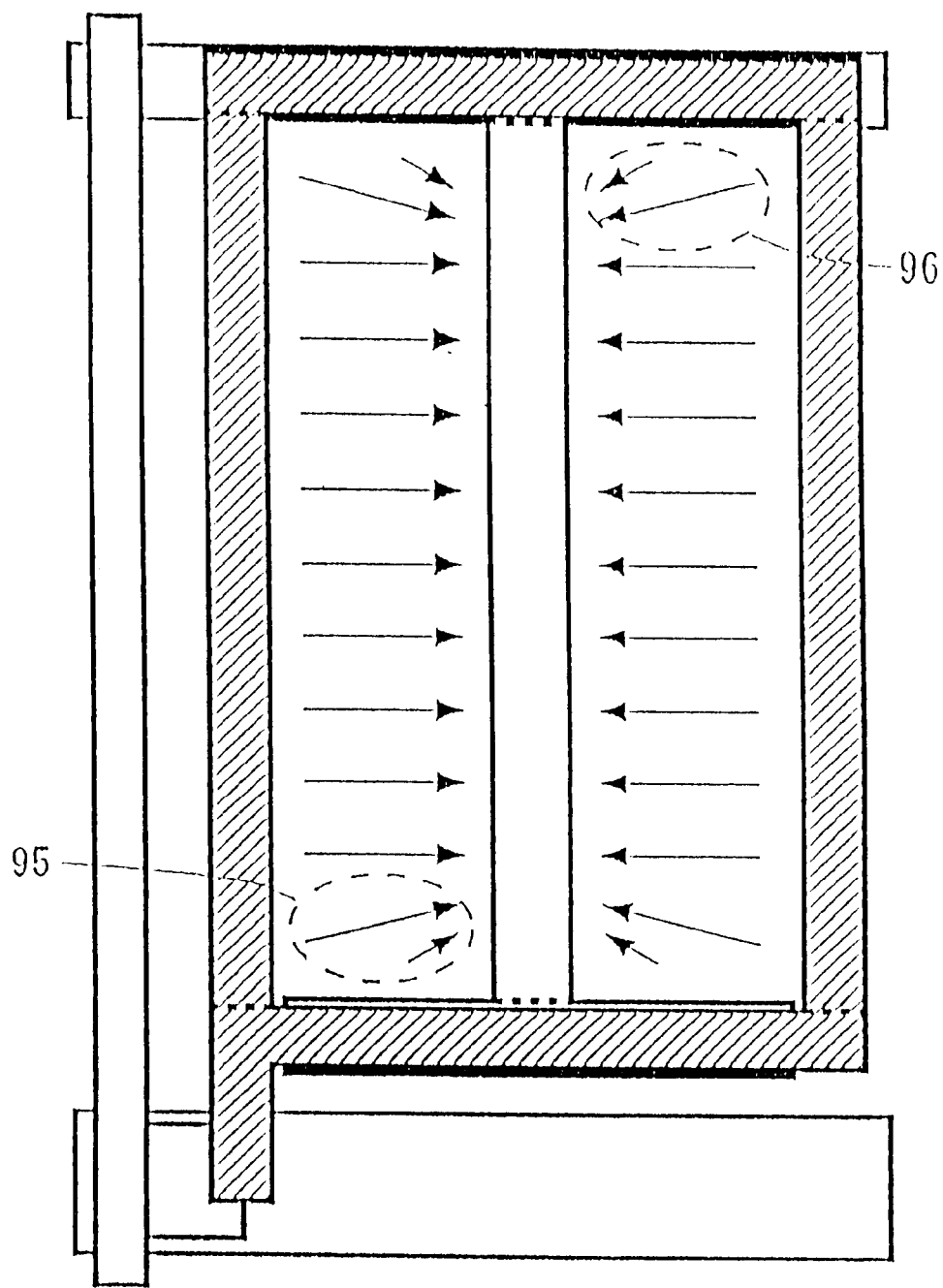
FIG. 14 shows the direction of the electric field in the prior structure of electrode.
Figure 15:
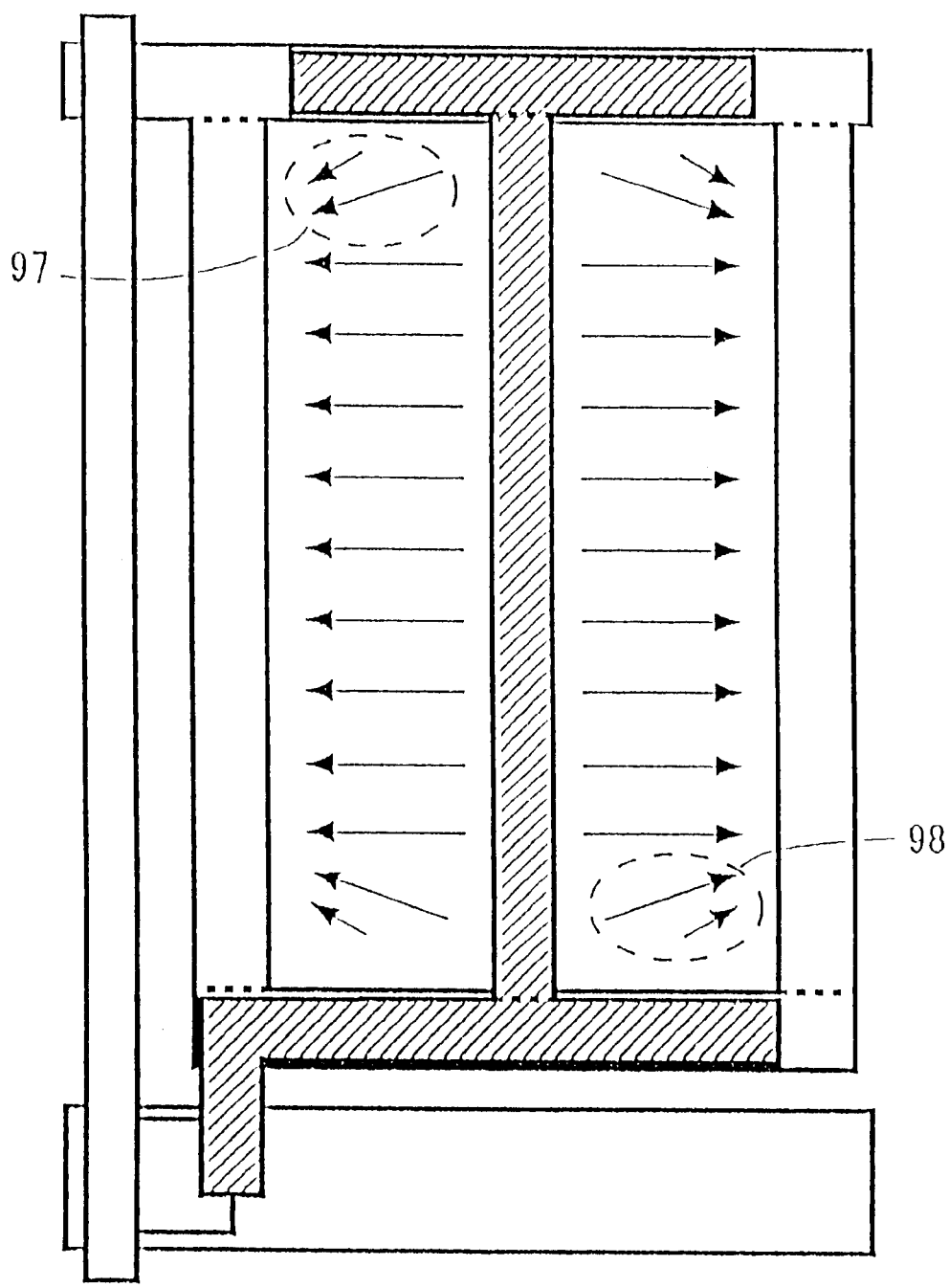
FIG. 15 shows the direction of the electric field in the prior structure of electrode.

In the case that the liquid crystal molecules are oriented in a different direction at the non-application of the electric field, the reverse twist is generated in the different positions. FIGS. 12 and 13 show the examples in which the liquid crystal molecules have the different orientation direction from the above cases. The FIG. 12 shows the orientation direction of the P type liquid crystal molecules, and the FIG. 13 shows the orientation direction of the N type liquid crystal molecules. It can be understood from the above description that the reverse twist is generated in the regions 95 and 96, wherein $\theta_e + \theta \leq 90°$, in the FIG. 14, and in the regions 97 and 98, wherein $\theta_e + \theta \leq 0°$ in the FIG. 15.

The inventors of the present invention has recognized the above problems caused by the prior structure of supplementary capacitor electrodes, and completed the present invention by changing the shape of the supplementary capacitor electrodes.

As described above, in the case that the supplementary capacitor electrode crosses to the switching electrode by 90 degrees, the electric fields in the two directions exist in the regions adjacent to the supplementary capacitor electrode, in addition to the electric field in the lateral direction generated between the two switching electrodes. The electric fields in these two directions are: the electric field 56 generated between the second switching electrode 52 and the first supplementary capacitor electrode 55; and the electric field 57 generated between the first switching electrode 54 and the second supplementary capacitor electrode 53, as shown in the FIG. 7. Also as described above, in the prior structure of the supplementary capacitor electrodes, the electric field 57 generates the reverse twist depending upon the orientation direction of the liquid crystal molecules at the non-application of the electric field. The inventors of the present invention has found that, in the case that the reverse twist is generated, the generation of the reverse twist is remarkably decreased by decreasing the influence of one of the above described electric fields in the two direction, which generates the reverse twist, on the orientation of the liquid crystal, and by increasing the influence of the other electric field on the liquid crystal. For example, it is possible to decrease the reverse twist generated in the upper right corner area shown in the FIG. 7 by making the shape of the electrode, (the second supplementary capacitor electrode 53 in the example shown in the FIG. 7), which exerts the large influence on the liquid crystal to generate the reverse twist, smaller than the shape of the electrode (the first supplementary capacitor electrode 55 in the FIG. 7) opposing to the electrode (53).

Figure 16:
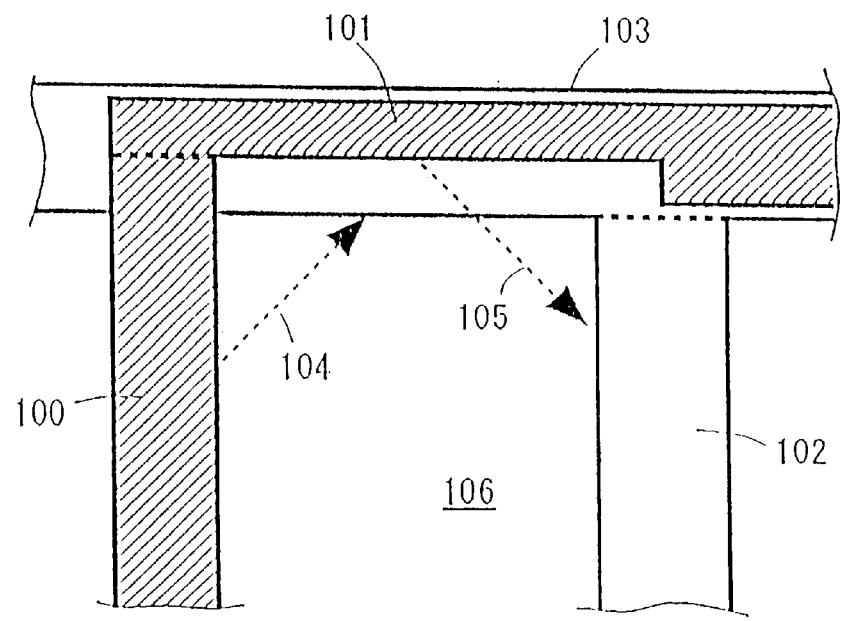
FIG. 16 shows the enlarged figure of the structure of the electrodes in accordance with the present invention.

FIG. 16 shows the structure of the electrodes in accordance with the present invention which improves the prior structure of the electrodes shown in the FIG. 7. In the FIG. 16, the liquid crystal molecules are also orientated to generate the reverse twist under the influence of the electric field

105. By making the shape of the second supplementary capacitor electrode 101 smaller than the shape of the first supplementary capacitor electrode 103 which opposes to the electrode 101, the influence of the electric field 105 on the liquid crystal molecules becomes small, and the influence of the electric field 104 on the liquid crystal molecules becomes large, so that the liquid crystal molecules are susceptible to be largely influenced by the electric field 104. As shown in the FIG. 16, it is particularly preferable that a side portion of the second supplementary capacitor electrode 101 facing to the light transmitting region 106 is removed, in other words, it is particularly preferable to satisfy such relationship that the edge of the second supplementary capacitor electrode 101 facing to the light transmitting region 106 is positioned at the inner position (the side apart from the light transmitting region 106) of the edge of the first supplementary capacitor electrode 103 (opposed to the electrode 101) facing to the light transmitting region 106. The electric field 104 directed from the second switching electrode 100 to the first supplementary capacitor electrode 103 is not susceptible to be influenced by the repulsion effect of the second supplementary capacitor electrode 101, so that the degree of dive of the electric field 104 below the electric field 105 along the surface of the substrate is decreased. Inversely, since the electric field 105 from the second supplementary capacitor electrode 101 to the first switching electrode 102 is pulled by the first supplementary capacitor electrode 103, the degree of dive of the electric field 105 toward the substrate is increased. Accordingly, since the tendency of the dive of the electric field 105 toward the lower side of the electric field 104 is increased, the influence of the electric field 104 on the liquid crystal molecules is increased, so that the reverse twist can be decreased.

Figure 17:
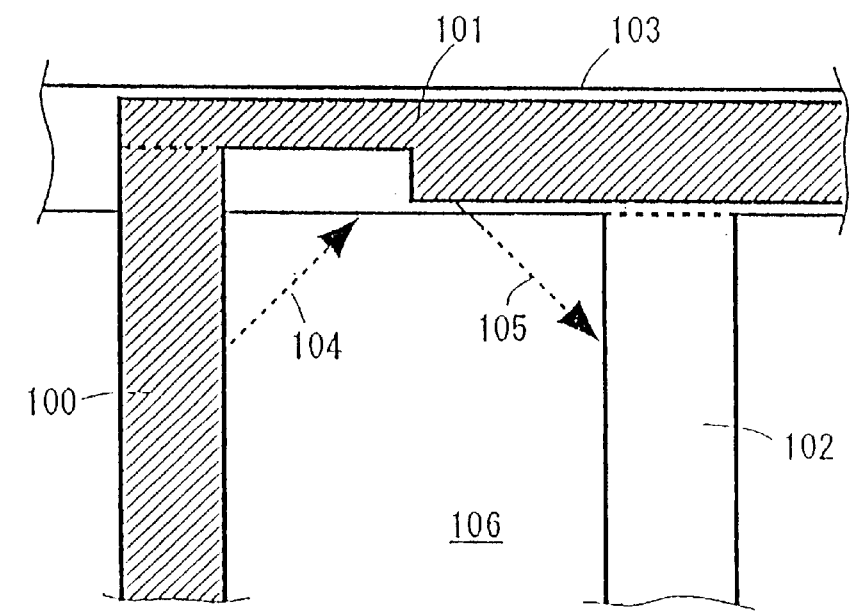
FIG. 17 shows the enlarged figure of the structure of the electrodes in accordance with the present invention.

The use of the shape of the supplementary capacitor electrode, a portion of which is removed, ç as shown in the FIG. 6, decreases an amount of electric charges stored in the supplementary capacitor. Accordingly, an amount, the shape and the position of the removed portion should be determined by taking account of the required size of the supplementary capacitor and the degree of reverse twist to be decreased. For example, if the effect for decreasing the degree of dive of the electric field 104 along the surface of the substrate is large, only a portion, adjacent to the second switching electrode 100, of the second supplementary capacitor electrode 101 can be removed, as shown in the FIG. 17, and if the effect for increasing the degree of dive of the electric field 105 along the surface of the substrate is large, only a portion of the second supplementary electrode 101 adjacent to the first switching electrode 102 can be removed, not shown.

Figure 18:
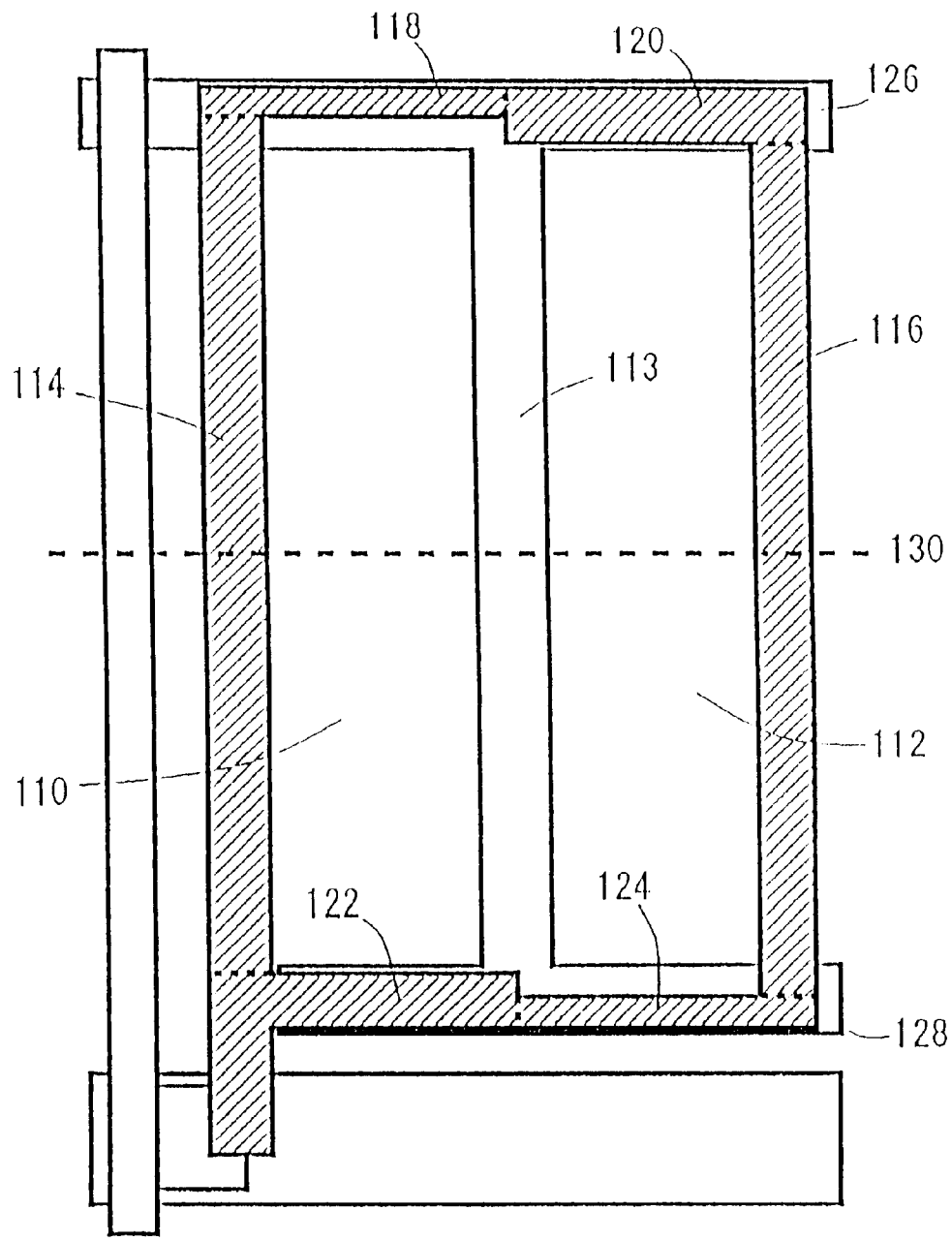
FIG. 18 shows the plan view of the structure of the electrodes in accordance with the present invention.
Figure 19:
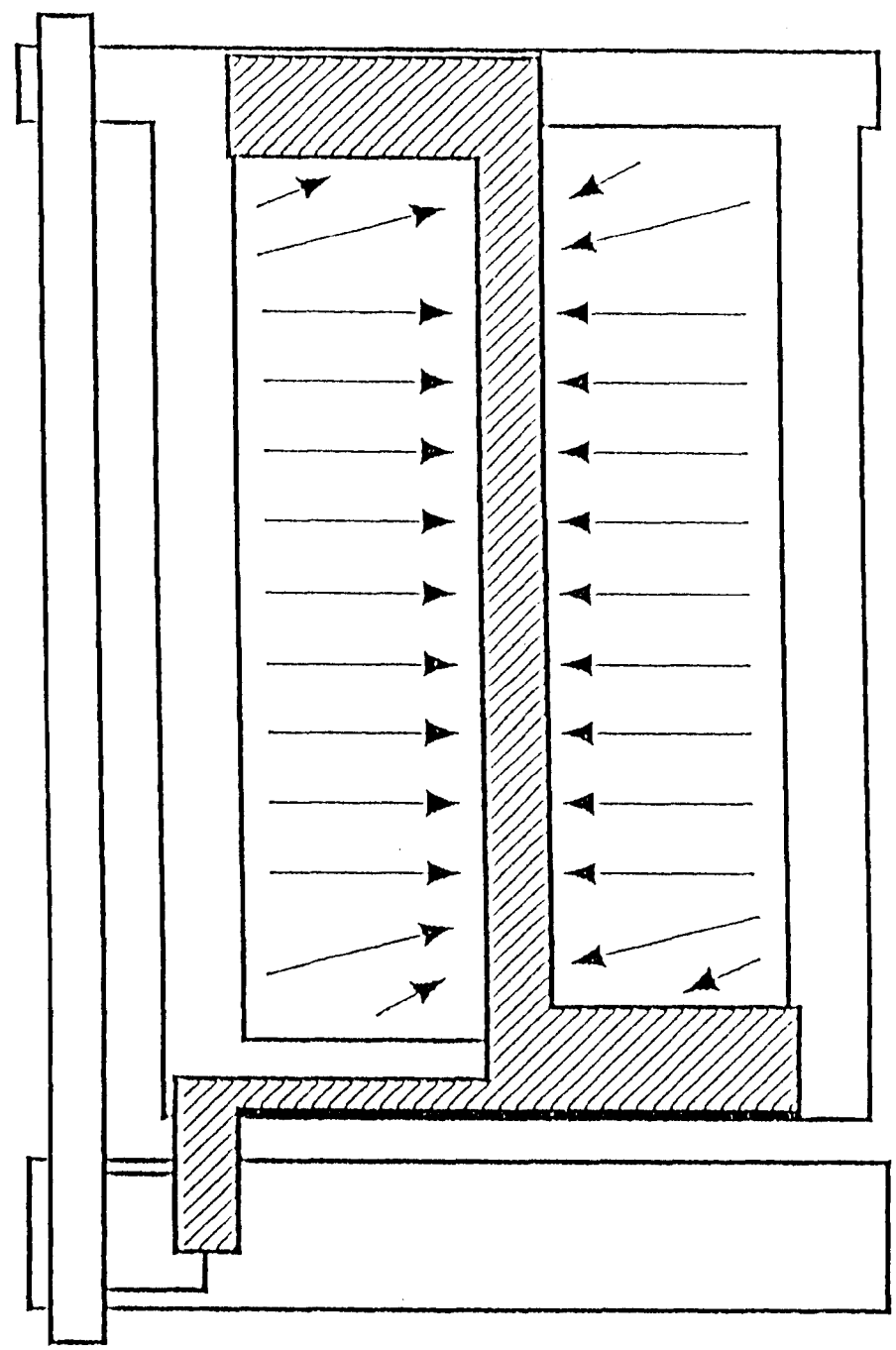
FIG. 19 shows the plan view of the structure of the electrodes in accordance with the present invention.
Figure 20:
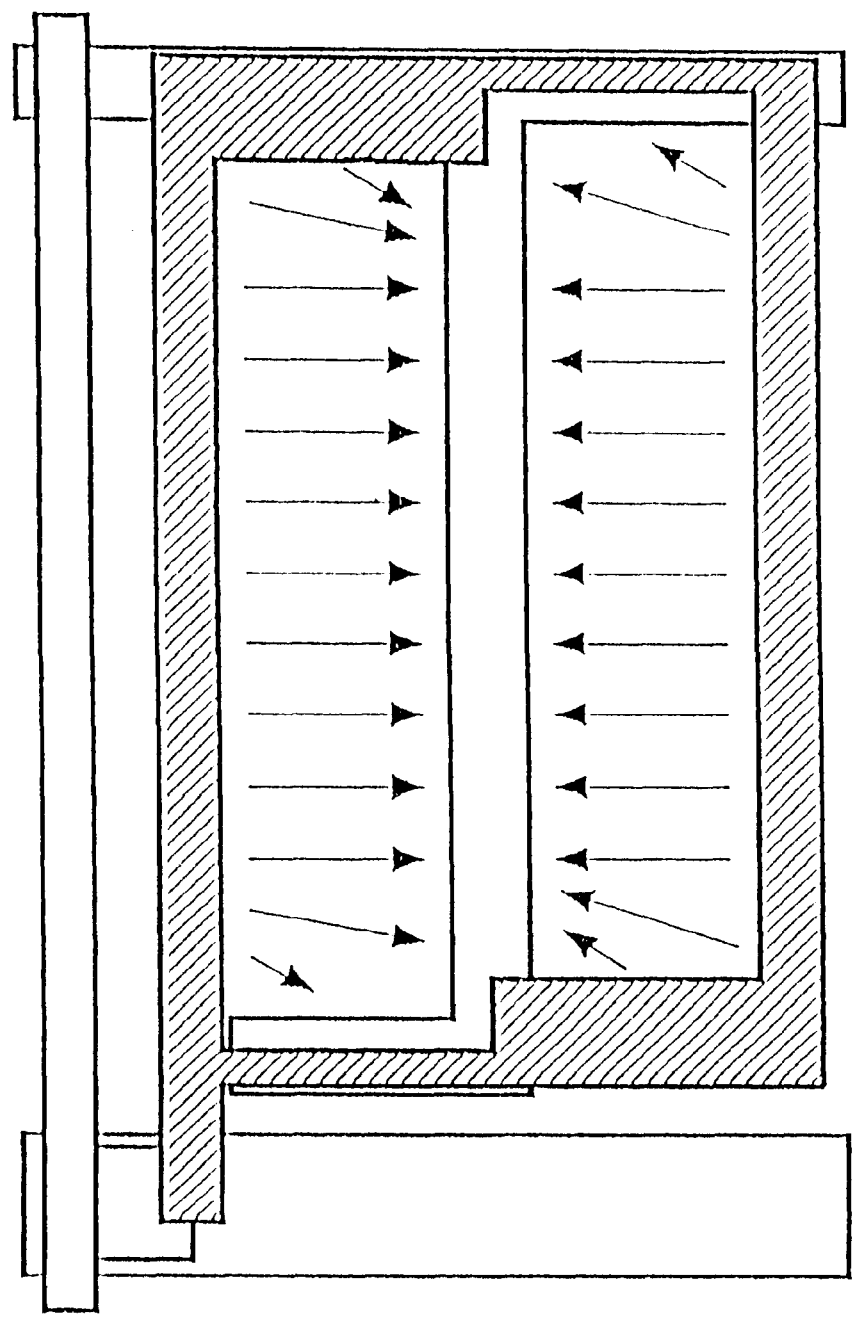
FIG. 20 shows the plan view of the structure of the electrodes in accordance with the present invention.
Figure 21:
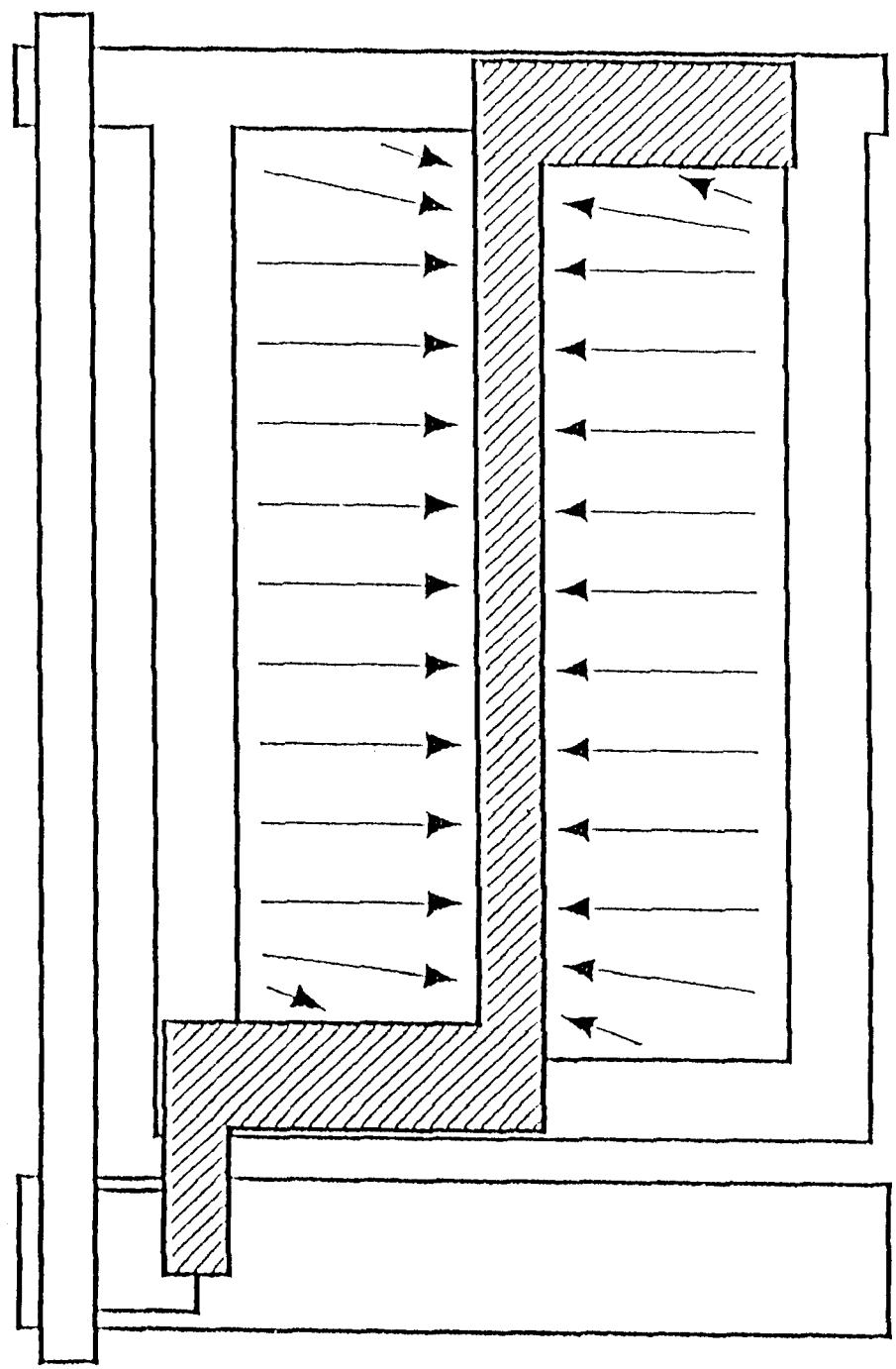
FIG. 21 shows the plan view of the structure of the electrodes in accordance with the present invention.

FIGS. 18, 19, 20 and 21 show the structures of the electrodes in accordance with the present invention which improve the prior structures of the electrodes shown in the FIGS. 5, 6, 14 and 15. The FIGS. 18 and 20 show the shapes of the electrodes in which a portion of the supplementary capacitor electrodes generating the reverse twist is removed or cut. As shown in the FIGS. 19 and 21, the entire supplementary capacitor electrode generating the reverse twist (the upper right portion in the FIG. 19, and the upper left and lower right portions in the FIG. 21) can be removed.

Most of the reverse twist generate in the region adjacent to the supplementary capacitor electrodes disposed at one end of the light transmitting region, but some reverse twist generate in the region adjacent to the supplementary capacitor electrodes disposed at the other end of the light transmitting region opposed to the one end. More particularly, some reverse twist may generate in the regions 65 and 66 shown in the FIG. 5. A phenomenon for remarkably decreasing the transmissivity has been observed in these regions. In the former regions in which a lot of the reverse twist are generated, the reverse twist is generated by the electric field generated between the switching electrode and the supplementary capacitor electrode. The precise cause for generating some reverse twist in the latter regions has not been found yet. It can be considered, however that the electric field with a certain irregularity is distributed in the direction of the thickness under the influence of the electric field generated between the switching electrode and the supplementary capacitor electrode and the electric field generated between the supplementary capacitor electrodes, and the component of the electric field in a certain direction may generate the reverse twist. It has been experimentally confirmed that, in the latter regions, a rate or a degree of generation of the reverse twist is small in the case that the size of the upper side supplementary capacitor electrode located at the side of the liquid crystal is larger that the size of the lower side supplementary capacitor electrode located at the side of the substrate. This phenomenon is contrary to that observed in the former regions. More particularly, a rate or a degree of the generation of the reverse twist is small in the case that the upper side supplementary capacitor electrodes are more extended toward the light transmitting region than the lower side supplementary capacitor electrodes, as shown by the upper left and lower right electrodes in the FIG. 19 and the upper right and lower left electrodes in the FIG. 21.

Viewing the shapes of the electrodes shown in the FIGS. 18 through 21, the following common points can be found. In the structure of the electrodes shown in the FIG. 18, the first switching electrode 113 is disposed at the central portion, the second switching electrodes 114 and 116 are disposed at the left and right sides of the electrode 113, respectively, and the first supplementary capacitor electrodes 126 and 128 connected to the first switching electrode 113 and the second supplementary capacitor electrodes 118, 120, 122 and 124 connected to the second switching electrodes 114 and 116, respectively are provided. Considering the first switching electrode 113 located at the center as an axis of symmetry, the size and the shape of the two supplementary capacitor electrodes, such as the second supplementary capacitor electrodes 118 and 120, are asymmetrical to each other. Considering an axis 130 between the first supplementary capacitor electrode 126 and the first supplementary capacitor electrode 128 as an axis of symmetry, the two supplementary capacitor electrodes located at the upper and lower sides of the axis 130, such as the second supplementary capacitor electrode 118 and the second supplementary capacitor electrode 122, are asymmetrical to each other. To the contrary, the shapes of the electrodes are arranged in a diagonal relationship, such as this second supplementary capacitor electrodes 118 and 124, and 120 and 122, may be the same or differ from each other. If the supplementary capacitor electrodes arranged in the diagonal relationship have the same shape, the shape of the region of the supplementary capacitor electrodes are centrosymmetrical around a center point of the first switching electrode. To provide a plurality of light transmitting regions having the same characteristic, it may be preferable to use the electrodes arranged in the centrosymmetry. The FIG. 19 shows the electrodes which are not arranged in the centrosymmetry.

The shape of the region, which is adjacent to the light transmitting region, of the upper side supplementary capacitor electrodes as the shape of the supplementary capacitor electrode has been discussed before. If the relative size of the lower side and upper side supplementary capacitor electrode is similar, only the size of the lower side supplementary capacitor electrode can be changed without changing the size of the upper side supplementary capacitor electrode, or the size of both the upper side and lower side supplementary capacitor electrodes can be changed. In the exemplary cases, the shape of the outer edge, which is faced to the adjacent pixel elements, of the electrodes is the same, that is, the outer edges of the upper side and lower side electrodes are substantially aligned to each other. If the direction or the intensity of the electric field can be changed by changing the shape of the outer edges of the upper side and lower side electrodes, the shape of the outer edges of the upper side and lower side electrodes can be changed.

The embodiments of the present invention in which the two sets of supplementary capacitor electrodes are disposed in the vertical direction to the switching electrode has been described before. It can be understood, however, that the electric field in the oblique direction can be generated in the case that the supplementary capacitor electrodes are not precisely vertical to the switching electrode, but are kept in non-parallel with the switching electrode. Accordingly, even if the supplementary capacitor electrodes are disposed in the oblique direction to the switching electrode, the above described concept of the present invention can be used to suppress the influence of the electric field in the oblique direction on the liquid crystal to decrease the influence of the reverse twist. Although the embodiments in which the two sets of the supplementary capacitor electrodes are used by taking account of the shield from the gate lines and the required value of the supplementary capacitor, the concept of the present invention can be used to decrease the generation of the reverse twist in the case that the reverse twist is generated in the structure in which one set of the supplementary capacitor electrodes is used or more than two sets of the supplementary electrodes are used.

Figure 22:
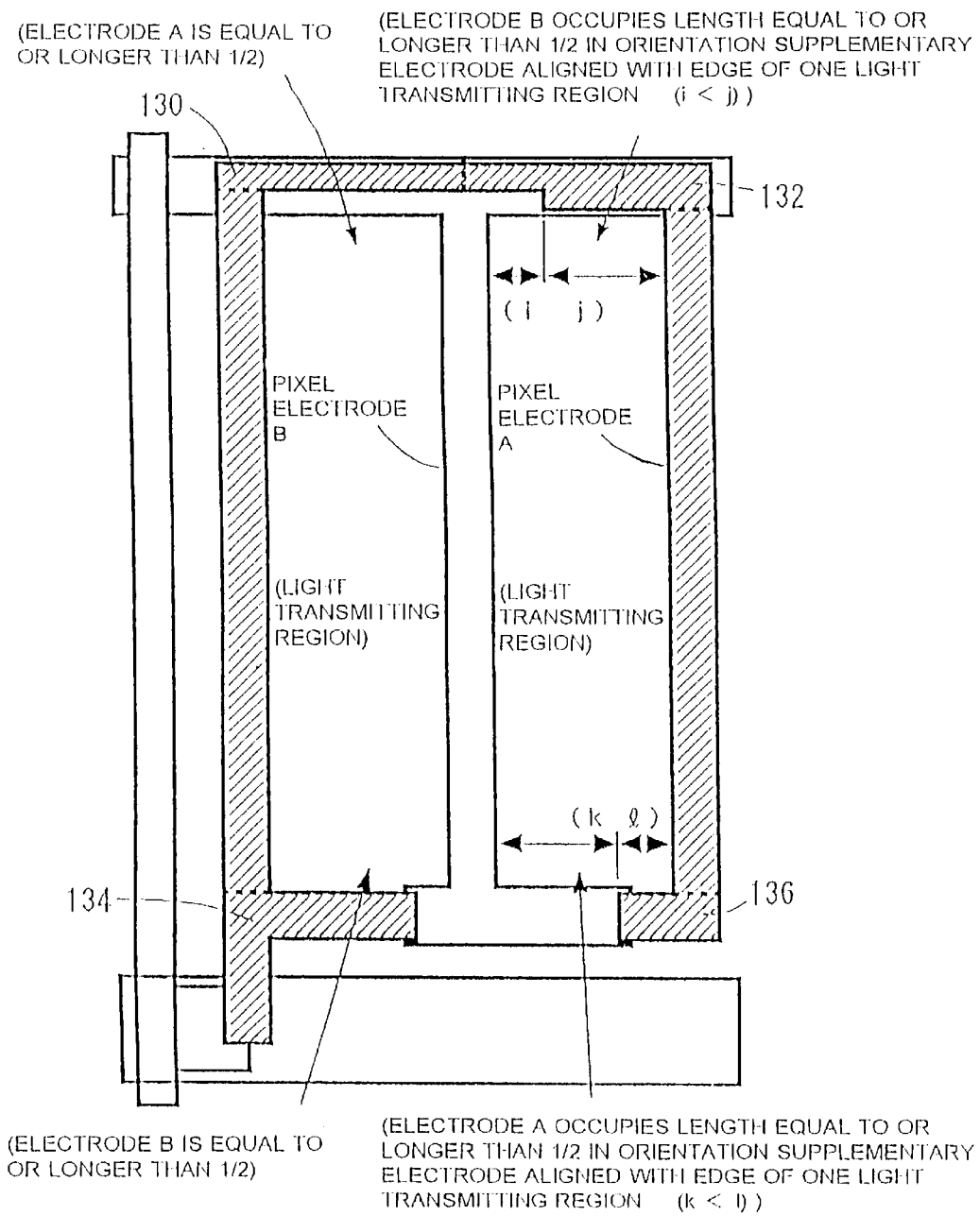
FIG. 22 shows the plan view of structure of the electrodes in accordance with the present invention.

FIG. 22 shows another embodiment of the present invention. In this embodiment, the supplementary capacitor electrode can be cut or removed to shorten its length along a longitudinal direction as the case of the second supplementary capacitor electrode 130, can be cut to shorten its length along a lateral direction as the case of the second supplementary capacitor electrodes 134 and 136, and can be cut to shorten its length along both the longitudinal and lateral directions as the case of the second supplementary capacitor electrode 132. In the structure shown in the FIG. 22, a lower right portion and a lower left portion of the lower side supplementary capacitor electrode are removed or cut to perform more effective control of the direction of the electric field.

Figure 23:
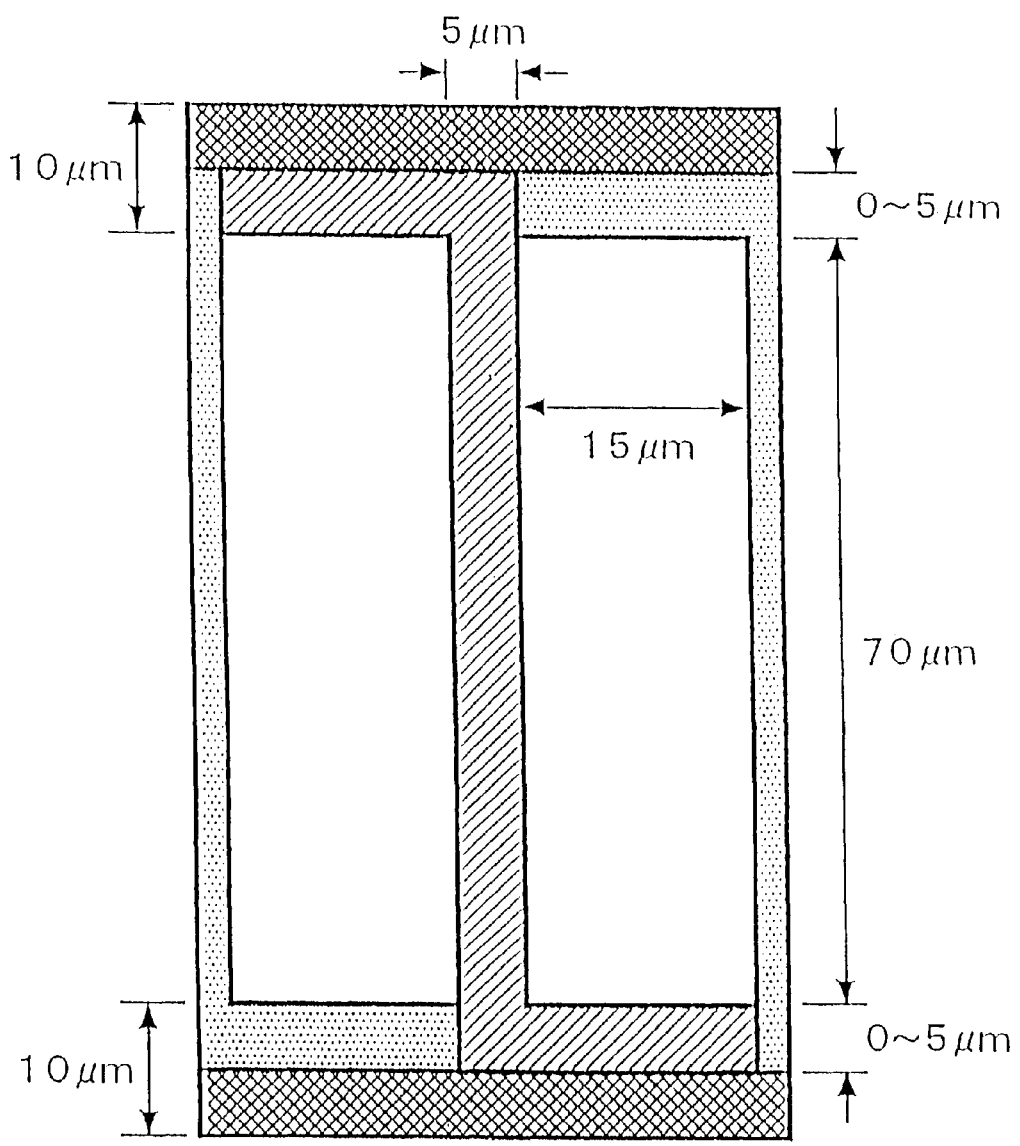
FIG. 23 shows the structure of the electrodes used to perform the simulation.
Figure 24:
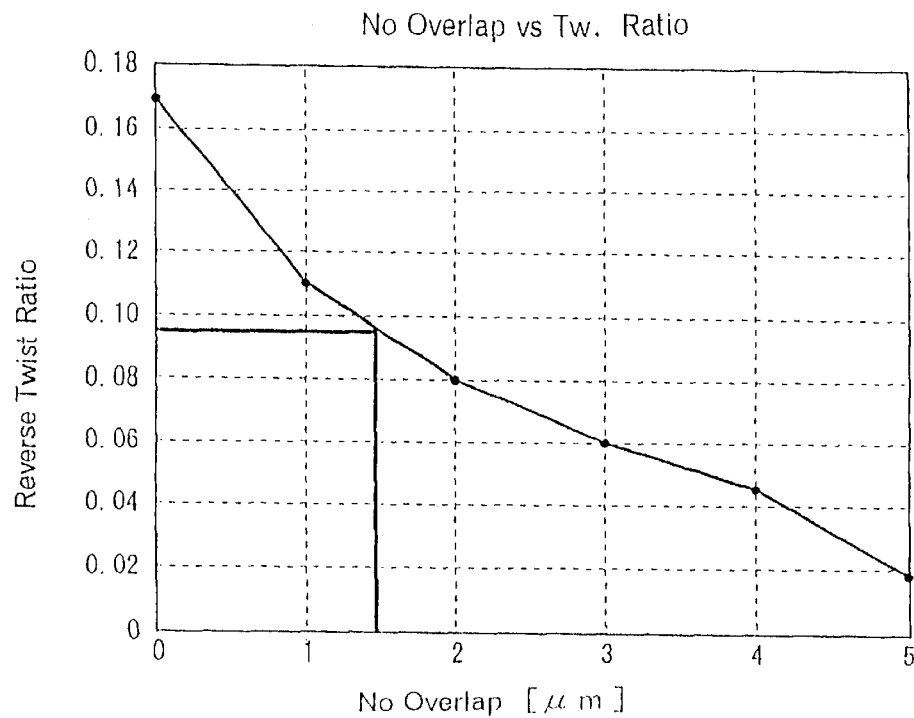
FIG. 24 shows the graph showing the result of the simulation.

A Reverse Twist Ratio to the display area (representing the ratio of the area, in which the reverse twist is generated, to the display area) in the case that an overlap of the upper side electrode and the lower side electrode is changed by changing the shape of the electrodes is measured by using a simulation tool (LCD Master 3D). FIG. 23 shows the structure of the electrodes used to perform the simulation for finding a desired amount of overlap of the upper side electrode and the lower side electrode. The insulating material is sandwiched between the electrode A and the electrode B to prevent an electrical short circuit. FIG. 24 shows a relationship between an amount of cut portion and the Reverse Twist Ratio. It is apparent that the larger the non-overlap portion is, the lesser is the generation of the reverse twist. It is apparent that the non-overlap portion of at least 1.5 çm is required to reduce the Reverse Twist Ratio to a value equal to or less than ½.

Figure 26:
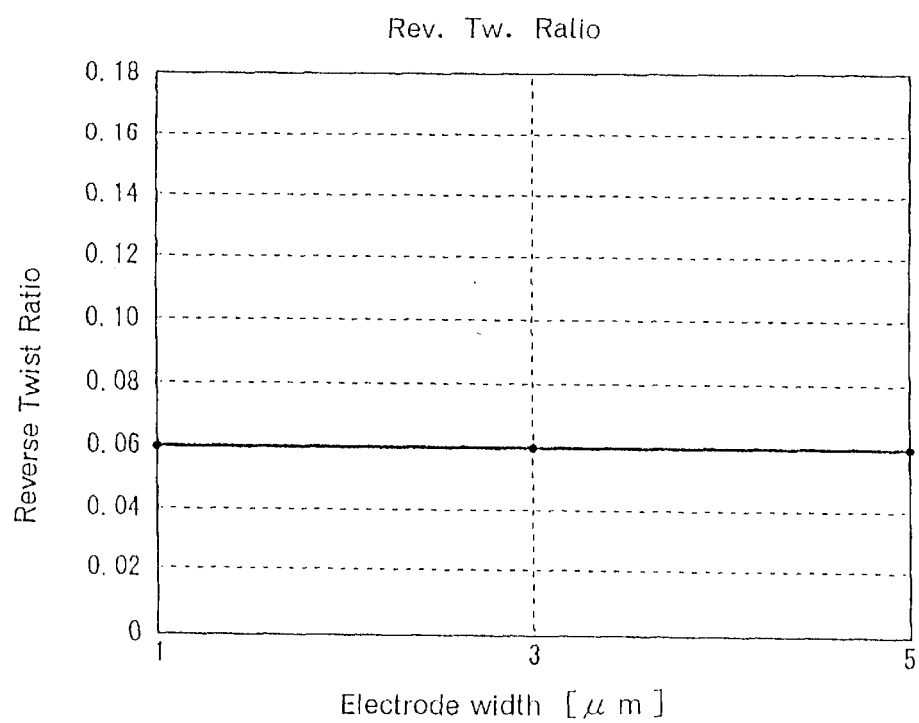
FIG. 26 shows the graph showing the result of the simulation.
Figure 25:
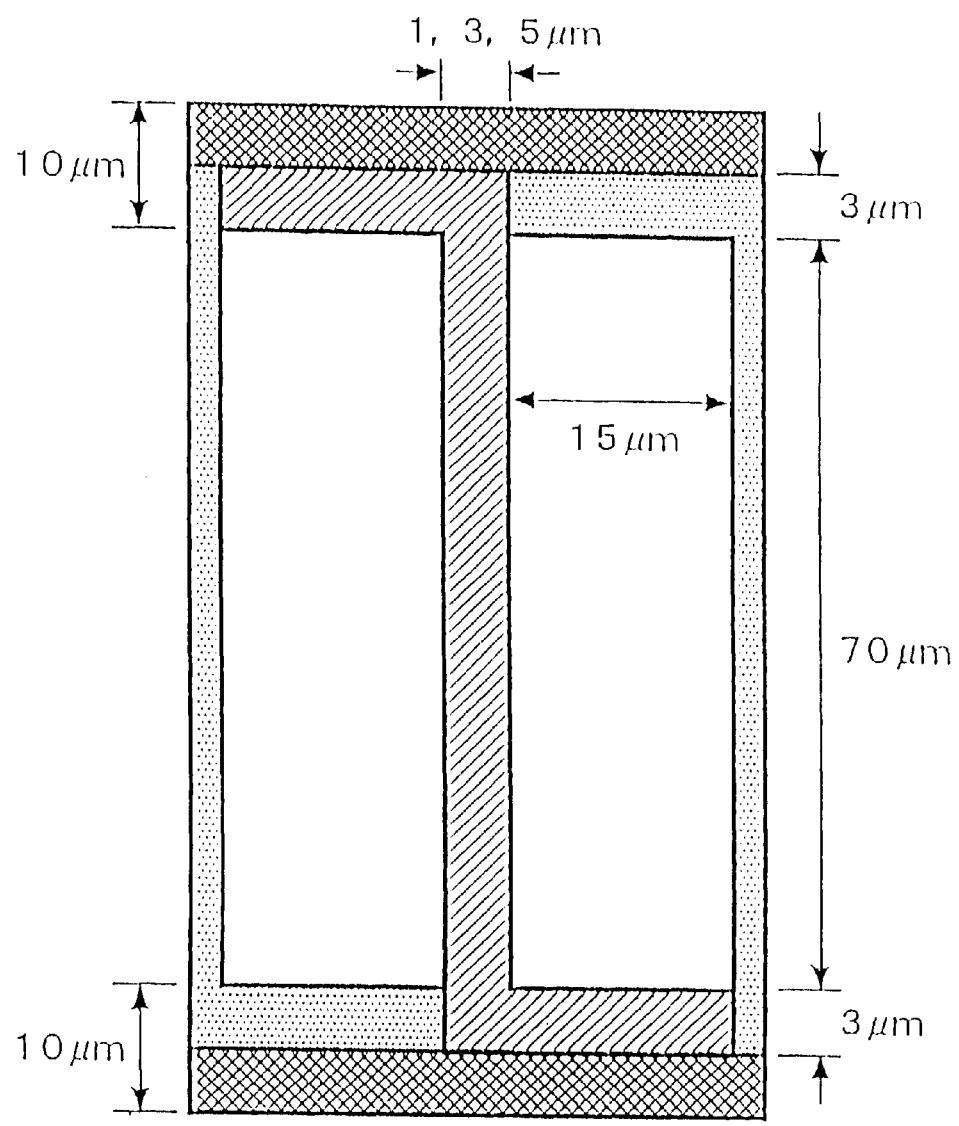
FIG. 25 shows the structure of the electrodes used to perform the simulation.

FIG. 25 shows the structure of the electrodes used to perform the simulation for finding a desired width of the central switching electrode. It has been confirmed that the Reverse Twist Ratio is not changed by changing the width of the central switching electrode, as shown in the FIG. 26.

Figure 27:
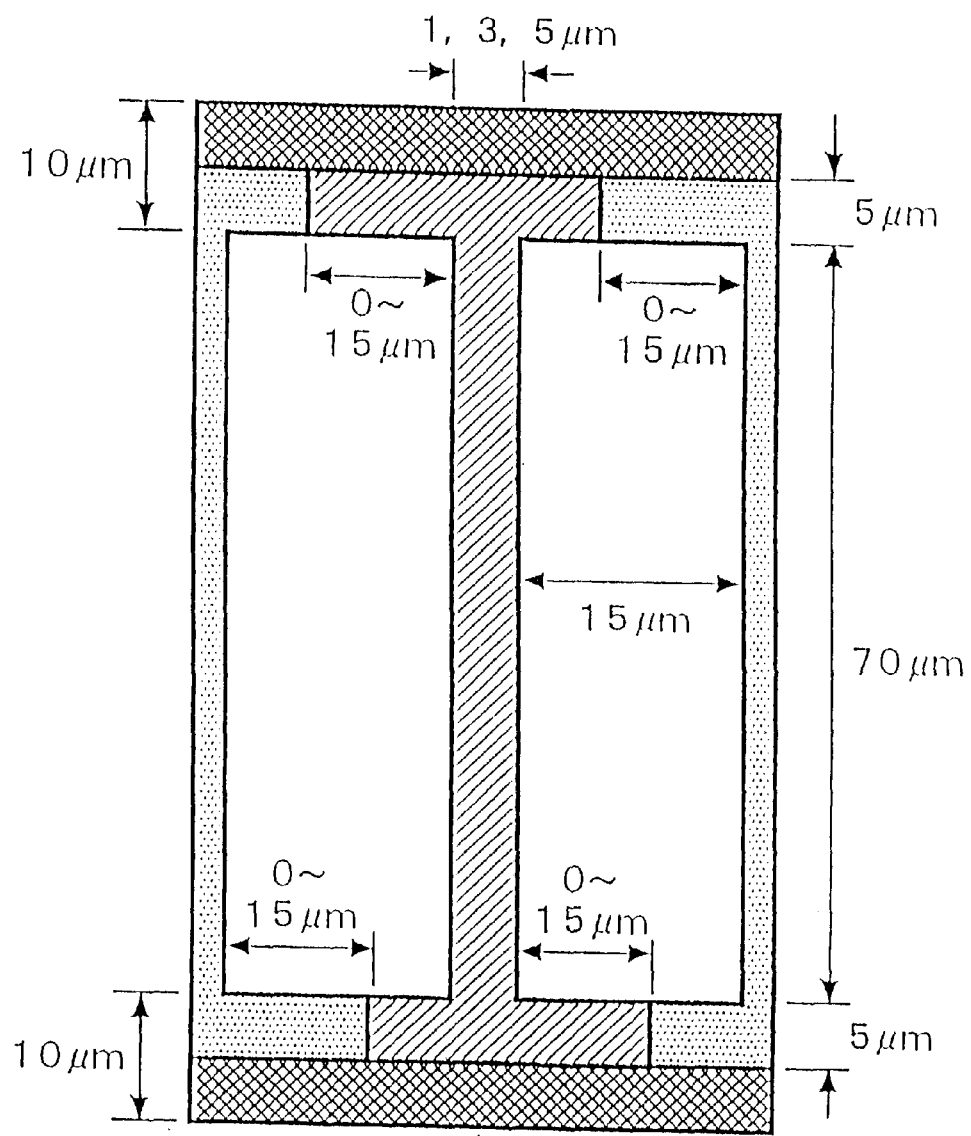
FIG. 27 shows the structure of the electrodes used to perform the simulation.
Figure 28:
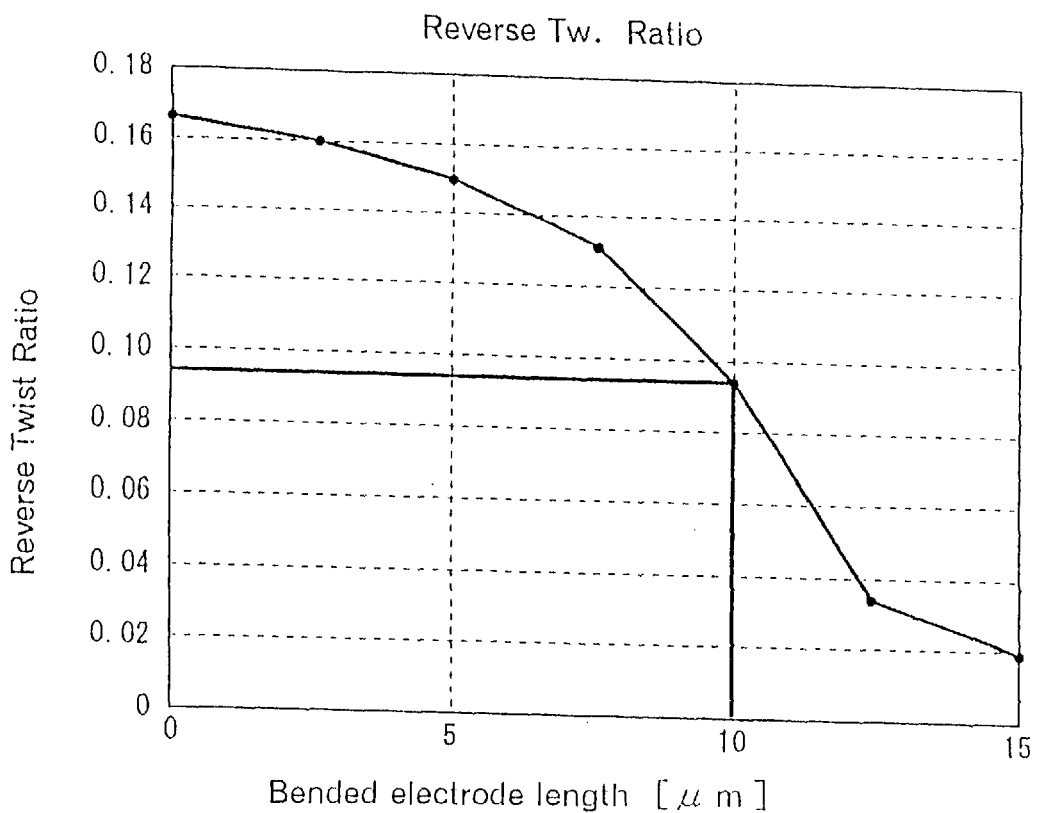
FIG. 28 shows the graph showing the result of the simulation.

FIG. 27 shows the structure of the electrodes used to perform the simulation for finding a desired length of the electrode along the lateral direction in the case that the width of the electrode removed in the longitudinal direction is fixed to 5 çm. The Reverse Twist Ratio is measured by changing the width of the electrode removed in the lateral direction from 0 çm ç 15 çm. It is apparent from the FIG. 8 that the length of the electrode in the horizontal direction equal to or longer than 10 çm, i.e. the length equal to or longer than ⅔ of the space between the electrodes, to reduce the Reverse Twist Ratio to a value equal to or less than ½.

Figure 29:
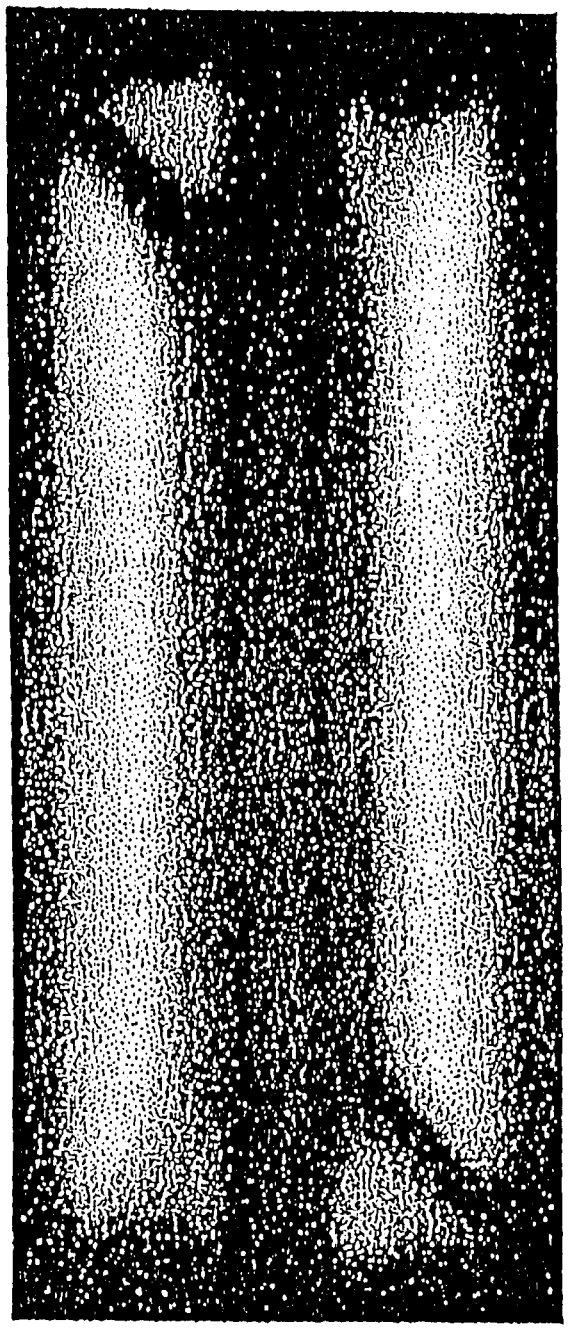
FIG. 29 shows the light transmission in the prior structure of the electrode.
Figure 30:
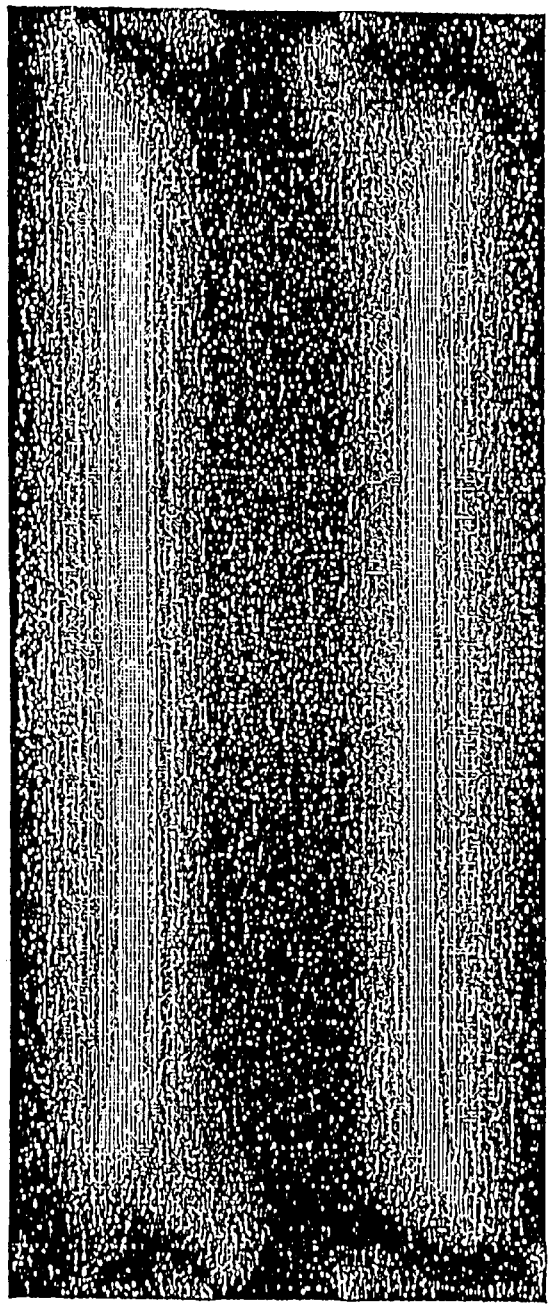
FIG. 30 shows the light transmission in the structure of the electrode in accordance with the present invention.

FIG. 29 shows the light transmission in the case of the prior structure of the electrode shown in the FIG. 5. It is apparent that the reverse twist is generated in the upper left portion and the lower right portion. FIG. 30 shows the light transmission in the case of the structure of the electrode in accordance with the present invention shown n the FIG. 20. It is apparent that the reverse twist is not generated and the transmissivity is improved in the lower left portion and the upper right portion.

The present invention defines the structure of the supplementary capacitor electrodes of the LCD device operated in the IPS mode, which prevents the generation of the reverse twist. The present invention can realizes the decrease of the generation of the reverse twist to improve the response speed and the aperture ratio of the LCD device.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A liquid crystal display apparatus comprising:
   a pair of substrates;
   a pixel electrode formed on one of said pair of substrates and formed in each of a plurality of pixel elements, and including at least one first switching electrode, at least one second switching electrode being disposed in parallel to said first switching electrode and a supplementary capacitor;
   at least one light transmitting region defined by said first switching electrode and said second switching electrode; and
   a liquid crystal layer sandwiched between said pair of substrates, and including liquid crystal molecules oriented in a plane parallel to a surface of said substrate;
   wherein said supplementary capacitor comprises a first supplementary capacitor electrode connected to said first switching electrode and arranged in a direction which is non-parallel to said first switching electrode; an insulating layer formed on said first supplementary capacitor electrode, and a second supplementary capacitor electrode formed on said insulating layer, connected to said second switching electrode and arranged in a direction which is non-parallel to said second switching electrode, wherein said liquid crystal display apparatus includes and additional supplementary capacitor, said additional supplementary capacitor includes a first additional supplementary capacitor electrode connected to said first switching electrode and arranged in a direction which is non-parallel to said first switching electrode, a second additional supplementary capacitor electrode connected to said second switching electrode and arranged in a direction which is non-parallel to said second switching electrode, and an insulating layer; and a shape of a portion, adjacent to said light transmitting region, of said second additional supplementary capacitor electrode is larger than a shape of a portion, adjacent to said light transmitting region, of said first additional supplementary capacitor electrode.

2. The liquid crystal display apparatus according to claim 1, wherein said first supplementary capacitor electrode is connected to said first switching electrode in a direction substantially vertical to said first switching electrode, said second supplementary capacitor electrode is connected to said second switching electrode in a direction substantially vertical to said second switching electrode, said first additional supplementary capacitor electrode is connected to said first switching electrode in a direction substantially vertical to said first switching electrode, said second additional supplementary capacitor electrode is connected to said second switching electrode in a direction substantially vertical to said second switching electrode.

3. A liquid crystal display apparatus according to claim 1, wherein said liquid crystal molecules are rotated in a predetermined direction in said plane parallel to said surface of said substrate by an electric field generated between said first switching electrode and said second switching electrode, and the size of said portion adjacent to said light transmitting region of said second supplementary capacitor electrode is smaller than the size of said portion adjacent to said light transmitting region of said first supplementary capacitor electrode to prevent a reverse twist of said liquid crystal molecules from being generated by an electric field which is generated between said first switching electrode and said second supplementary capacitor electrode.

4. A liquid crystal display apparatus according to claim 1, wherein the number of first switching electrodes is N (wherein N is an integer equal to or larger than 2) and the number of second switching electrodes is (N−1); or the number of first switching electrodes is (N−1) and the number of second switching electrodes is N; said first switching electrodes and said second switching electrodes are alternately arranged; and the number of light transmitting regions is (2N−2).

5. A liquid crystal display apparatus according to claim 4, wherein two light transmitting regions are formed at both sides of said first switching electrode or said second switching electrode; the shape of portion, adjacent to one of said two light transmitting regions, of said second supplementary capacitor electrode and the shape of portion, adjacent to the other light transmitting region, of said second supplementary capacitor electrode are non-symmetrical around said first switching electrode or said second switching electrode.

6. A liquid crystal display apparatus comprising:
a pair of substrates;
a pixel electrode formed on one of said pair of substrates and formed in each of a plurality of pixel elements, and including at least one first switching electrode, at least one second switching electrode disposed in parallel to said first switching electrode and a supplementary capacitor; at least one light transmitting region defined by said first switching electrode and said second switching electrode; a liquid crystal layer sandwiched between said pair of substrates, and including a liquid crystal molecules oriented in plane parallel to a surface of said substrate;

wherein said supplementary capacitor comprises a first supplementary capacitor electrode connected to said first switching electrode and arranged in a direction which is non-parallel to said first switching electrode; and insulating layer formed on said first supplementary capacitor electrode, and a second supplementary capacitor electrode formed on said insulating layer, connected to said second switching electrode and arranged in a direction which is non-parallel to said second switching electrode, and wherein a size of said first supplementary capacitor electrode adjacent to said light transmitting region differs from a size of said second supplementary capacitor electrode adjacent to said light transmitting region, wherein the number of first switching electrodes is N (wherein N is an integer equal to or larger than 2) and the number of second switching electrodes is (N−1); or the number of first switching electrodes is (N−1) and the number of second switching electrodes are alternately arranged; and the number of light transmitting regions is (2N−2), and wherein two light transmitting regions are formed at both sides of said first switching electrode or said second switching electrode; the shape portion, adjacent to one of said two light transmitting regions, of said second supplementary capacitor electrode and the shape portion, adjacent to the other light transmitting region, of said second supplementary capacitor electrode are non-symmetrical around said first switching electrode or said second switching electrode.

7. A liquid crystal display apparatus according to claim 6, wherein two light transmitting regions are formed at both sides of said first switching electrode or said second switching electrode; the shape of portion, adjacent to one of said two light transmitting regions, of said second supplementary capacitor electrode and the shape of portion, adjacent to the other light transmitting region, of said second supplementary capacitor electrode are centrosymmetrical around a center point of said first switching electrode or said second switching electrode.

8. A liquid crystal display apparatus according to claim 1, wherein a portion of said second supplementary capacitor electrode is aligned with an edge of said light transmitting region adjacent to said second supplementary capacitor electrode, and the length of said portion is in the range of 0% ç 50% of the length of said edge.

9. A liquid crystal display apparatus comprising:
a pair of substrates;
a pixel electrode formed one of said pair of substrates and formed in each of a plurality of pixel elements, and including at lease one first switching electrode, at least one second electrode disposed in parallel to said first switching electrode and a supplementary capacitor; at least one light transmitting region defined by said first switching electrode and said second switching electrode; and a liquid crystal layer sandwiched between said pair of substrates, and including liquid crystal molecules oriented in a plane parallel to a surface of said substrate;

wherein said supplementary capacitor comprises a first supplementary capacitor electrode connected to said first switching electrode and arranged in a direction which is non-parallel to said first switching electrode: an insulating layer formed on said first supplementary capacitor electrode, and a second supplementary capacitor electrode formed on said insulating layer, connected to said second switching electrode and arranged in a direction which is non-parallel to said second switching electrode; and wherein a size of said first supplementary capacitor electrode adjacent to said light transmitting region differs from a size of said second supplementary capacitor electrode adjacent to said light transmitting region, wherein a portion of said second supplementary capacitor electrode is aligned with an edge of said light transmitting region adjacent to said second supplementary capacitor electrode, and the length of said portion is in the range of 0%–50% of the length of said edge.

* * * * *